(12) United States Patent
Fukuhara et al.

(10) Patent No.: US 7,127,111 B2
(45) Date of Patent: *Oct. 24, 2006

(54) IMAGE CODING APPARATUS AND METHOD, IMAGE DECODING APPARATUS AND METHOD, AND RECORDING MEDIUM

(75) Inventors: Takahiro Fukuhara, Kanagawa (JP); Seiji Kimura, Chiba (JP); Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 783 days.

This patent is subject to a terminal disclaimer.

(21) Appl. No.: 10/290,405

(22) Filed: Nov. 8, 2002

(65) Prior Publication Data

US 2003/0198391 A1 Oct. 23, 2003

(30) Foreign Application Priority Data

Apr. 19, 2002 (JP) .............................. 2002-118516

(51) Int. Cl.
*G06K 9/36* (2006.01)

(52) U.S. Cl. ........................ 382/232; 382/233; 382/240

(58) Field of Classification Search ................ 382/128, 382/232, 239–240, 244–248; 375/240.11, 375/240.19, 240.25; 348/398.1, 408.1
See application file for complete search history.

(56) References Cited

U.S. PATENT DOCUMENTS

| | | | | |
|---|---|---|---|---|
| 5,384,869 A | * | 1/1995 | Wilkinson et al. .......... | 382/240 |
| 5,798,794 A | * | 8/1998 | Takahashi ............... | 375/240.11 |
| 5,825,935 A | * | 10/1998 | Murakoshi .................. | 382/248 |
| 6,125,143 A | * | 9/2000 | Suzuki et al. .......... | 375/240.11 |
| 6,229,926 B1 | * | 5/2001 | Chui et al. .................. | 382/240 |
| 6,477,280 B1 | * | 11/2002 | Malvar ....................... | 382/232 |
| 6,487,318 B1 | * | 11/2002 | Cho ............................ | 382/240 |
| 6,560,369 B1 | * | 5/2003 | Sato ........................... | 382/239 |
| 6,876,772 B1 | * | 4/2005 | Fukuhara et al. ........... | 382/240 |
| 6,925,209 B1 | * | 8/2005 | Boliek et al. ............... | 382/239 |
| 2001/0021223 A1 | * | 9/2001 | Andrew .................. | 375/240.11 |

OTHER PUBLICATIONS

U.S. Appl. No. 10/691,650, filed Oct. 24, 2003, Fukuhara et al.

* cited by examiner

*Primary Examiner*—Duy M. Dang
(74) *Attorney, Agent, or Firm*—Oblon, Spivak, McClelland, Maier & Neustadt, P.C.

(57) ABSTRACT

According to the present invention, not only still images but also moving images can be compressed with high quality. In an image coding apparatus, a wavelet transform unit low-pass filters and high-pass filters an input image signal in the vertical and horizontal directions to hierarchically transform a low frequency component repetitively. In the case of an interlaced image, the wavelet transform unit further decomposes a subband including, for example, a horizontal low frequency component and a vertical high frequency component in consideration of the characteristics of the image signal. A code-block generation unit divides quantized coefficients into code-blocks each having a predetermined size. The code-block serves as a unit subjected to entropy coding. In the case of the interlaced image, each code-block is set to, for example, 32×32 so as to be smaller than each code-block of a progressive image.

42 Claims, 20 Drawing Sheets

LH-1 COMPONENT

| LEVEL | HL | LH | HH |
|---|---|---|---|
| 5 | 1.000000 | 1.000000 | 1.000000 |
| 4 | 1.000000 | 1.000000 | 1.000000 |
| 3 | 0.999994 | 0.999994 | 0.999988 |
| 2 | 0.837755 | 0.837755 | 0.701837 |
| 1 | 0.275783 | 0.275783 | 0.090078 |

Cb

| LEVEL | HL | LH | HH |
|---|---|---|---|
| 5 | 0.812612 | 0.812612 | 0.737656 |
| 4 | 0.679829 | 0.679829 | 0.567414 |
| 3 | 0.488887 | 0.488887 | 0.348719 |
| 2 | 0.267216 | 0.267216 | 0.141965 |
| 1 | 0.089950 | 0.089950 | 0.027441 |

Cr

| LEVEL | HL | LH | HH |
|---|---|---|---|
| 5 | 0.856065 | 0.856065 | 0.796593 |
| 4 | 0.749805 | 0.749805 | 0.655884 |
| 3 | 0.587213 | 0.587213 | 0.457826 |
| 2 | 0.375176 | 0.375176 | 0.236030 |
| 1 | 0.166647 | 0.166647 | 0.070185 |

FIG. 19

|   | LEVEL | HL | LH | HH |
|---|---|---|---|---|
| Y | 5 | 1.000000 | 1.000000 | 1.000000 |
|   | 4 | 1.000000 | 1.000000 | 1.000000 |
|   | 3 | 0.999994 | 0.999994 | 0.999988 |
|   | 2 | 0.837755 | 0.9 | 0.701837 |
|   | 1 | 0.275783 | 0.8 | 0.090078 |

|   | LEVEL | HL | LH | HH |
|---|---|---|---|---|
| Cb | 5 | 0.812612 | 0.812612 | 0.737656 |
|   | 4 | 0.679829 | 0.679829 | 0.567414 |
|   | 3 | 0.488887 | 0.488887 | 0.348719 |
|   | 2 | 0.267216 | 0.4 | 0.141965 |
|   | 1 | 0.089950 | 0.5 | 0.027441 |

|   | LEVEL | HL | LH | HH |
|---|---|---|---|---|
| Cr | 5 | 0.856065 | 0.856065 | 0.796593 |
|   | 4 | 0.749805 | 0.749805 | 0.655884 |
|   | 3 | 0.587213 | 0.587213 | 0.457826 |
|   | 2 | 0.375176 | 0.4 | 0.236030 |
|   | 1 | 0.166647 | 0.5 | 0.070185 |

IMAGE CODING APPARATUS AND METHOD, IMAGE DECODING APPARATUS AND METHOD, AND RECORDING MEDIUM

BACKGROUND OF THE INVENTION

1. Field of the Invention

The present invention relates to an image coding apparatus and method for compressing an image using wavelet transform and entropy coding according to, for example, JPEG-2000, an image decoding apparatus and method for decoding the compressed image, and a recording medium in which a program to allow a computer to execute an image coding process or an image decoding process is recorded.

2. Description of the Related Art

Conventional typical image compression systems include JPEG (Joint Photographic Experts Group) standardized by the ISO (International Standards Organization). JPEG uses discrete cosine transform (DCT). As is generally known, according to the DCT, favorable coded images and decoded images are provided when a bit-rate is relatively high. However, when the number of bits to be coded is less than a predetermined value, block distortion inherent in the DCT becomes noticeable. Thus, a subjective loss of image quality may be noticeably found.

On the other hand, there is a system in which an image is divided into a plurality of frequency bands using a filter called a filter bank composed of a high-pass filter and a low-pass filter and each frequency band component is then coded. In recent years, researches and studies of this system are increasing. Among them, wavelet transform coding is regarded as the most effective new technique that substitutes for the DCT because the wavelet transform coding does not have a disadvantage in that block distortion is noticeable due to high compression in the same case as in the DCT.

JPEG-2000 has completed as international standards in January 2001. JPEG-2000 uses a system accomplished by combining the wavelet transform with high-efficient entropy coding (bit modeling and arithmetic coding for each bit-plane), thus realizing remarkably improved coding efficiency higher than that of JPEG.

In these international standards, only standards for a decoder are defined. Standards for an encoder can be freely designed. On the other hand, there is no standard regarding means for reducing large loads on processes of the entropy coding and means for effectively controlling a bit-rate in order to realize target compressibility. Therefore, it is important to establish the know-how to reduce the loads and to control a bit-rate. Particularly, in JPEG, it is difficult to control a bit-rate. In many cases, coding has to be performed many times until a target bit-rate is achieved. However, it results in long processing time. In JPEG-2000, it is desired to obtain a target bit-rate by one implementation of coding.

JPEG-2000 is developed specifically for still images. Accordingly, in JPEG-2000, support for interlaced images which often exist in moving images is not studied enough. Therefore, if techniques for still images are applied to moving images, the image quality is noticeably degraded.

SUMMARY OF THE INVENTION

The present invention is proposed in consideration of the foregoing conventional situations. It is an object of the present invention to provide an image coding apparatus and method for compressing not only still images but also moving images with high quality using wavelet transform and entropy coding in the same way as in, for example, JPEG-2000, an image decoding apparatus and method for decoding the compressed images, and a recording medium in which a program to allow a computer to execute an image coding process or an image decoding process is recorded.

According to the present invention, there are provided an image coding apparatus and method in which an input image is low-pass filtered and high-pass filtered in the vertical and horizontal directions to generate subbands, a subband including a low frequency component is hierarchically filtered, each subband generated by filtering is decomposed into code-blocks each having a predetermined size, bit-planes including bits from the most significant bit to the least significant bit are generated every code-block, coding passes are generated every bit-plane, arithmetic coding is performed in the coding passes, a bit-rate is controlled to a target bit-rate on the basis of generated arithmetic codes, and a header is added to the arithmetic codes subjected to the bit-rate control to assemble a packet.

Preferably, during the filtering, when the input image is an interlaced image, a predetermined subband, for example, a subband including a horizontal low frequency component and a vertical high frequency component is further filtered in consideration of the characteristics of the input image.

According to the present invention, there are provided an image coding apparatus and method in which an input image is low-pass filtered and high-pass filtered in the vertical and horizontal directions to generate subbands, a subband including a low frequency component is hierarchically filtered, each subband generated by filtering is decomposed into code-blocks each having a predetermined size in consideration of the characteristics of the input image, bit-planes including bits from the most significant bit to the least significant bit are generated every code-block, coding passes are generated every bit-plane, arithmetic coding is performed in the coding passes, a bit-rate is controlled to a target bit-rate on the basis of generated arithmetic codes, and a header is added to the arithmetic codes subjected to the bit-rate control to assemble a packet.

Preferably, when the input image is an interlaced image, while the code-blocks are generated, each code-block is set to be smaller than that of a progressive image.

Preferably, each subband generated by filtering is decomposed into a plurality of rectangular areas using the characteristics of the input image. Code-blocks each having a predetermined size are generated every rectangular area. For example, when the input image is an interlaced image, each rectangular area of a predetermined subband, e.g., a subband including a horizontal low frequency component and a vertical high frequency component is smaller than those of the other subbands.

According to the present invention, there are provided an image coding apparatus and method in which an input image is low-pass filtered and high-pass filtered in the vertical and horizontal directions to generate subbands, a subband including a low frequency component is hierarchically filtered, each subband generated by filtering is decomposed into code-blocks each having a predetermined size, bit-planes including bits from the most significant bit to the least significant bit are generated every code-block, coding passes are generated every bit-plane, arithmetic coding is performed in the coding passes, a predetermined weighting coefficient value is set every generated subband, the weighting coefficient value is increased to preferentially encode the coding passes in a specific subband, or the weighting coefficient value is decreased to truncate the coding pass in the specific subband in order to control a bit-rate to a target bit-rate, and a header is added to arithmetic codes subjected to the bit-rate control to assemble a packet.

Preferably, in the bit-rate control, for example, when the input image is an interlaced image, the weighting coefficient value of a predetermined subband, e.g., a subband including a horizontal low frequency component and a vertical high frequency component is set to a large value. As the wavelet transform level of the subband is smaller, the weighting coefficient value thereof is set to be smaller. As the wavelet transform level of the subband is larger, the weighting coefficient value thereof is set to be larger.

According to the present invention, there are provided an image decoding apparatus and method in which each encoded code-stream generated as a packet is disassembled into a header and arithmetic codes, the arithmetic codes are decoded, coding passes are decoded every bit-plane, each code-block is reconstructed on the basis of the bit-planes including bits from the most significant bit to the least significant bit, the code-blocks are composed into each subband, and a subband including a low frequency component is hierarchically low-pass filtered and high-pass filtered in the vertical and horizontal directions. During filtering, a subband including a horizontal low frequency component and a vertical high frequency component is further filtered.

According to the present invention, there is provided a computer-readable recording medium in which a program to allow a computer to execute an image coding process or an image decoding process is recorded.

BRIEF DESCRIPTION OF THE DRAWINGS

FIG. 18 includes tables explaining actual weighting coefficients in the visual weighting method;

FIG. 19 includes tables explaining weighting coefficients for an interlaced image in the visual weighting method.

DESCRIPTION OF THE PREFERRED EMBODIMENT

A specific embodiment to which the present invention is applied will now be described in detail with reference to the drawings. According to the present embodiment, the present invention is applied to an image coding apparatus and method for compressing and coding an input image using JPEG-2000, and an image decoding apparatus and method for decoding the compressed image.

(1) Configuration and Operation of Image Coding Apparatus

Figure 1:
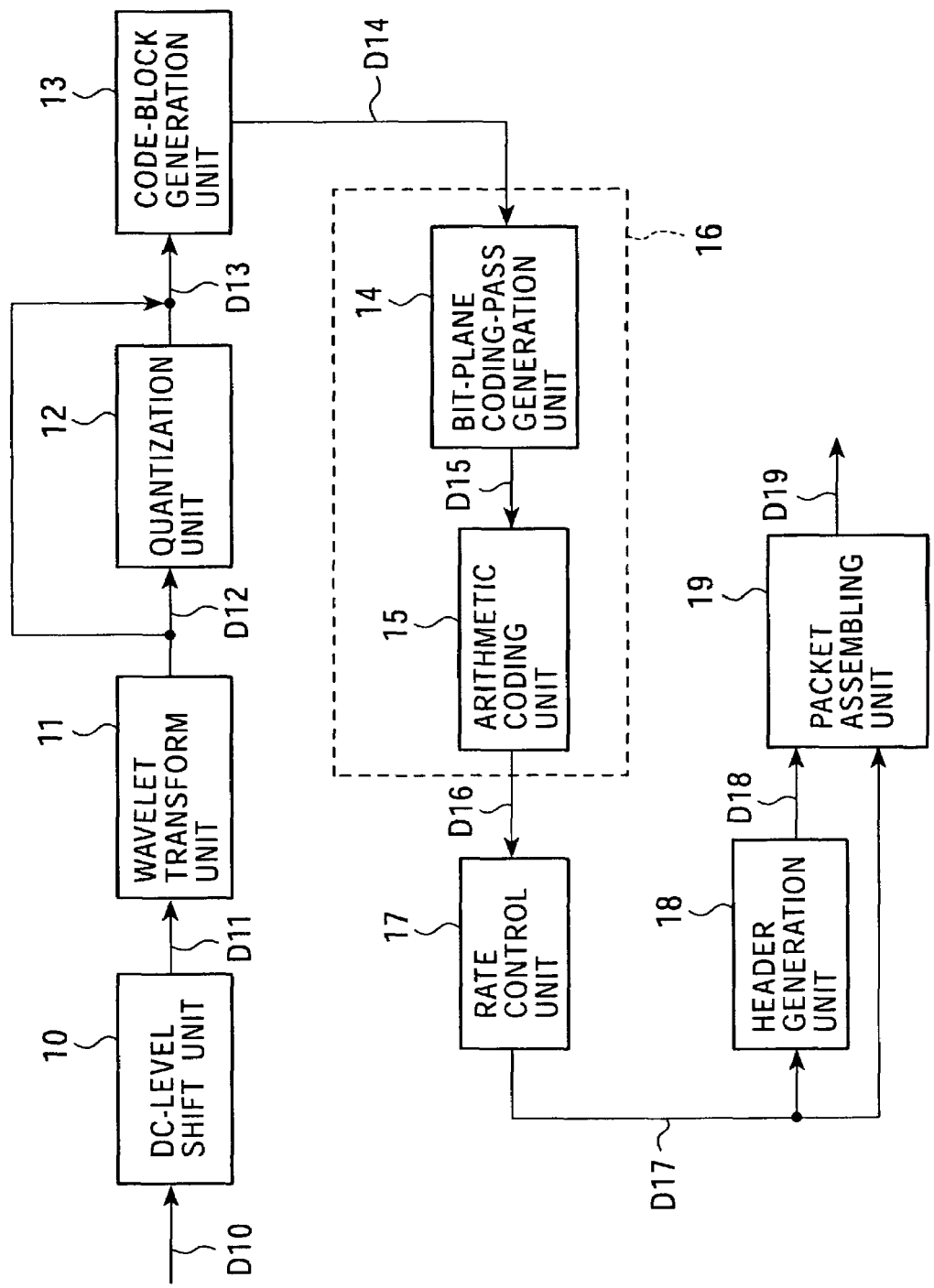
FIG. 1 is a schematic block diagram showing the configuration of an image coding apparatus according to an embodiment of the present invention.

FIG. 1 schematically shows the configuration of an image coding apparatus according to the present embodiment. Referring to FIG. 1, an image coding apparatus 1 comprises a DC-level shift unit 10, a wavelet transform unit 11, a quantization unit 12, a code-block generation unit 13, a bit-plane coding-pass generation unit 14, an arithmetic coding unit 15, a rate control unit 17, a header generation unit 18, and a packet assembling unit 19. An EBCOT (Embedded Coding with Optimized Truncation) unit 16 is composed of the bit-plane coding-pass generation unit 14 and the arithmetic coding unit 15.

The DC-level shift unit 10 shifts the level of each original signal in order to efficiently perform wavelet transform in the wavelet transform unit 11 arranged in the subsequent stage to increase the compressibility. In principle, RGB signals have positive values (unsigned integral values). Accordingly, the level is shifted, namely, the dynamic range of each original signal is reduced to half, so that the compressibility can be increased. On the other hand, each color-difference signal such as Cb or Cr among Y, Cb, and Cr signals has a positive or negative integral value. Accordingly, the level is not shifted.

The wavelet transform unit 11 is realized by a filter bank usually comprising a low-pass filter and a high-pass filter. Generally, a digital filter has impulse responses (filter coefficients) having different tap lengths. Therefore, it is necessary to previously buffer input images as much as the input images can be filtered. To simplify an explanation, buffering is not shown in FIG. 1.

The DC-level shift unit 10 receives the fewest possible image signals D10 to be filtered and shifts the level in each image signal as mentioned above. The wavelet transform unit 11 performs a filtering process for wavelet transform to each image signal D11 subjected to DC-level shifting, thus generating wavelet transform coefficients D12.

Figure 2:
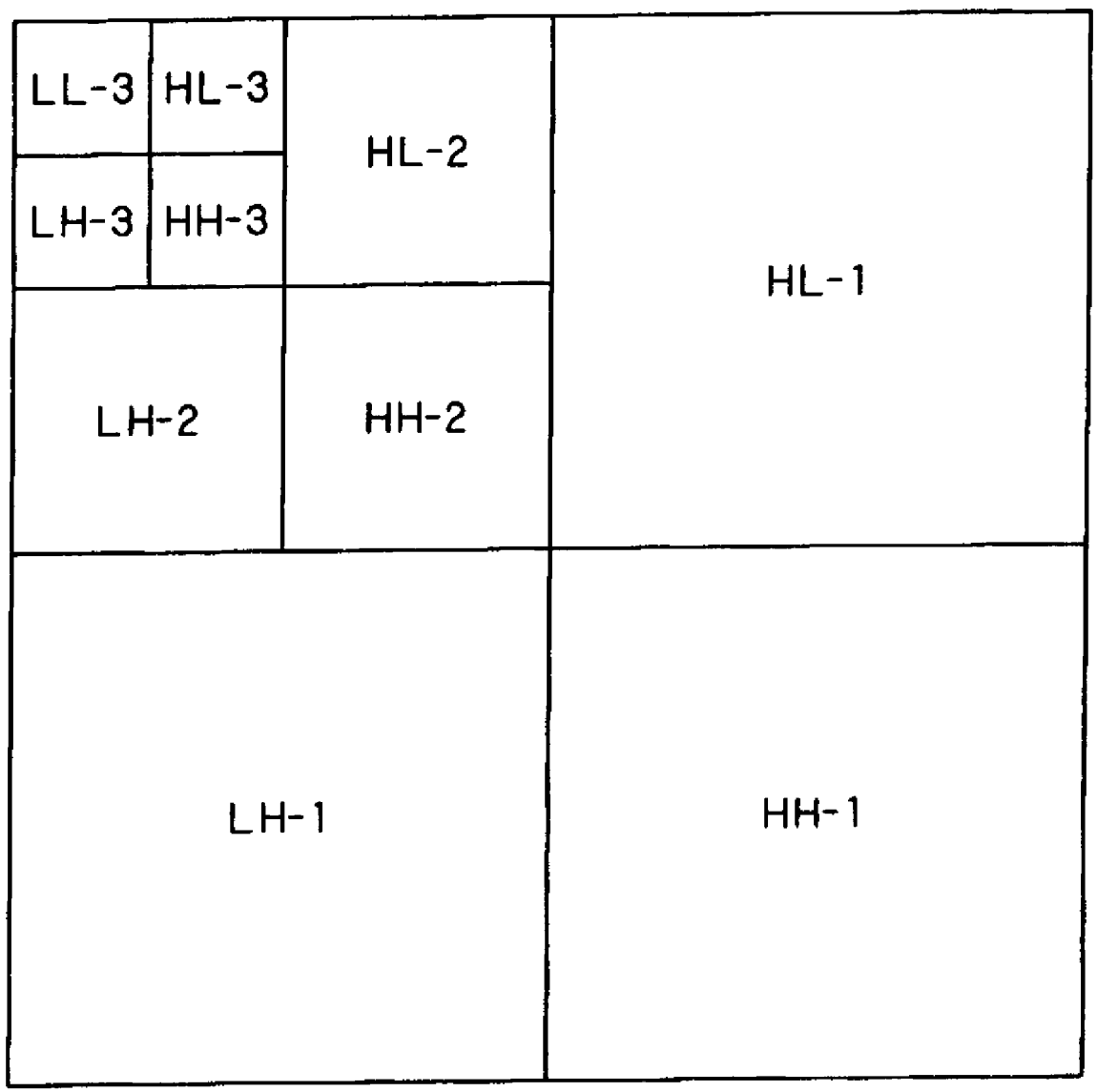
FIG. 2 is a diagram explaining subbands generated in such a manner that an image is subjected to wavelet transform to be decomposed into subbands (wavelet decomposition) at decomposition level 3.
Figure 3B:
FIGS. 3A and 3B are diagrams explaining subbands generated by performing the wavelet decomposition to an actual image.
Figure 3A:
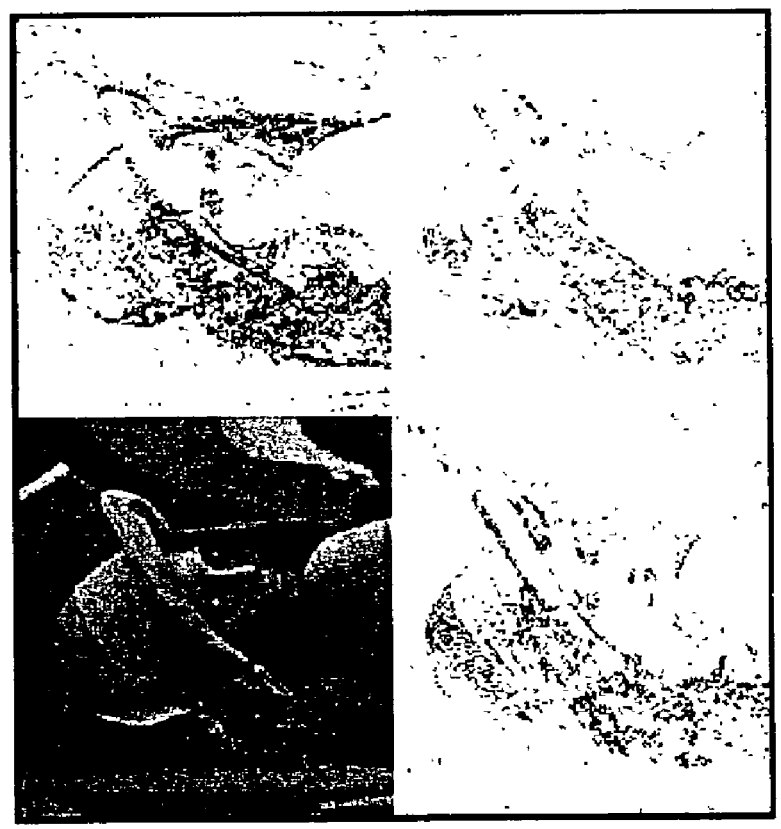

In the wavelet transform, generally, a low frequency component is repetitively transformed as shown in FIG. 2. The reason is that the energy of an image is mostly concentrated on the low frequency components of the image. This fact is clear from the following example. As shown in FIGS. 3A and 3B, when a decomposition level is raised from the decomposition level 1 shown in FIG. 3A to the decomposition level 3 shown in FIG. 3B, subbands are generated as shown in FIG. 3B. FIG. 2 shows a total of 10 subbands generated by wavelet transform at the decomposition level 3. Referring to FIG. 2, reference symbol L represents a low frequency and reference symbol H represents a high frequency. The number subsequent to L or H represents the decomposition level. For example, LH-1 represents a subband of the decomposition level 1, the subband comprising a horizontal low frequency component and a vertical high frequency component. In the case of an interlaced image, the wavelet transform unit 11 further decomposes a subband comprising, for example, a horizontal low frequency component and a vertical high frequency component in consideration of the characteristics of the image signals D11 as will be described in detail later.

The quantization unit 12 irreversibly compresses the wavelet transform coefficients D12 supplied from the wavelet transform unit 11. As quantizing means, scalar quantization in which the wavelet transform coefficients D12 are divided by a quantization step size can be used. In JPEG-2000, when an irreversible 9×7 wavelet transform filter is used in the foregoing irreversible compression, it is automatically determined that the scalar quantization is concurrently used. When a reversible 5×3 wavelet transform filter is used, quantization is not performed but a coding pass is truncated, as will be described later, thus controlling a bit-rate. Therefore, the quantization unit 12 in FIG. 1 actually operates so long as the irreversible 9×7 wavelet transform filter is used. An explanation will now be made on the assumption that the irreversible 9×7 wavelet transform filter is used.

Figure 4:
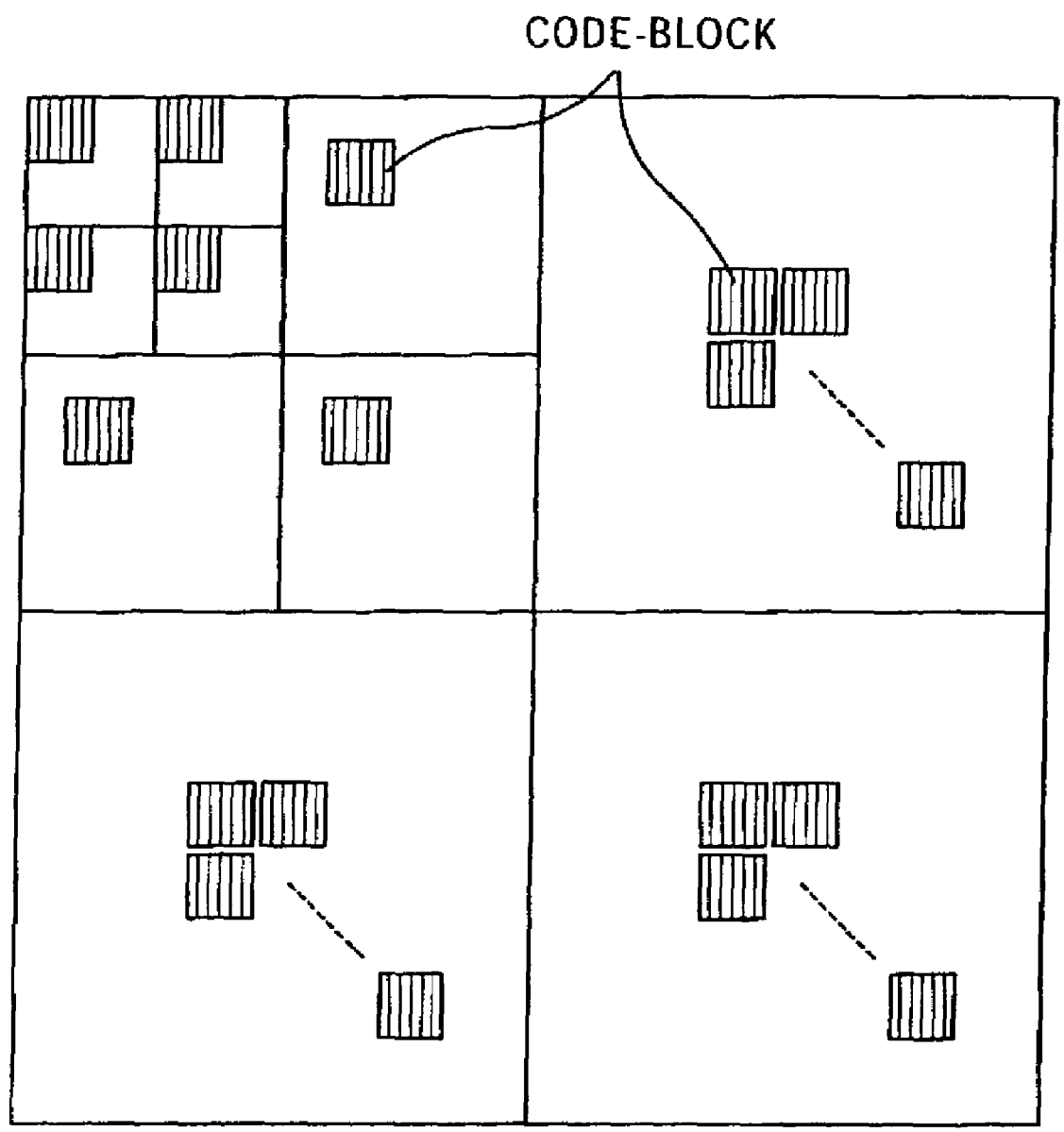
FIG. 4 is a diagram explaining the relationship between code blocks and subbands.

The code-block generation unit 13 divides quantized coefficients D13 generated by the quantization unit 12 into code-blocks each having a predetermined size. The code-block serves as a unit subjected to entropy coding. FIG. 4 shows the positional relation between the code-blocks and the subbands. Generally, code-blocks each having a size of, for example, 64×64 pixels are generated in all of the subbands after decomposition. Accordingly, when the size of a subband HH-1 (FIG. 2) of the smallest decomposition level is 640×320, ten code-blocks having a size of 64×64 are arranged in each row in the horizontal direction and five code-blocks are arranged in each column in the vertical direction. Namely, the subband HH-1 contains 50 code-blocks in total. The code-block generation unit 13 supplies quantized coefficients D14 of each code-block to the bit-plane coding-pass generation unit 14. A coding process in the subsequent stage is performed to each code-block.

The bit-plane coding-pass generation unit 14 performs coefficient-bit modeling to the quantized coefficients D14 of each code-block in the following manner. The present embodiment uses entropy coding called EBCOT defined in JPEG-2000 as an example. The EBCOT is disclosed in detail in, for example, "ISO/TEC 15444-1, Information Technology—JPEG 2000, Part 1: Core Coding System".

Figure 5C:
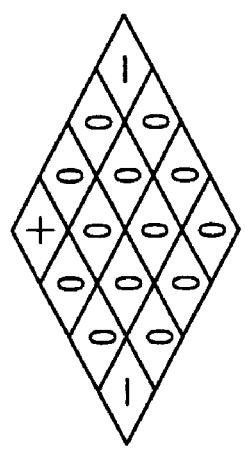
FIGS. 5A to 5C are diagrams explaining bit-planes, FIG. 5A showing quantized coefficients comprising 16 coefficients in total, FIG. 5B showing the bit-planes representing the absolute values of coefficients, and FIG. 5C showing a sign bit-plane.
Figure 5B:
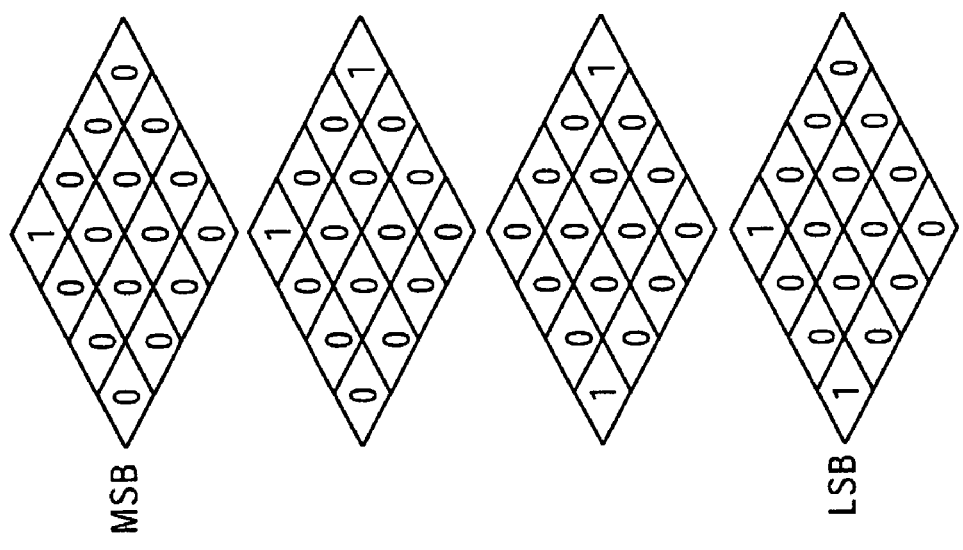
Figure 5A:
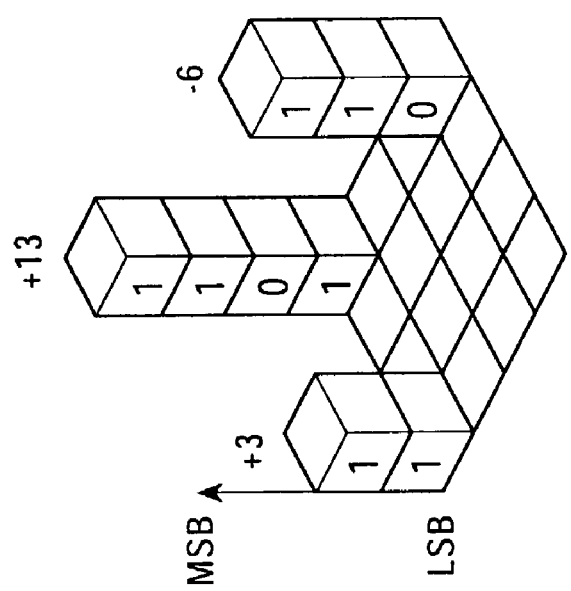

Prior to the explanation regarding the EBCOT, the concept of a bit-plane will now be described with reference to FIGS. 5A to 5C. FIG. 5A shows the assumption that quantized coefficients include four coefficients in the vertical direction and four coefficients in the horizontal direction, namely, 16 coefficients in total. The maximum absolute value of the 16 coefficients is 13. This value represents 1101 as binary numerals. Therefore, four bit-planes as shown in FIG. 5B represent the absolute values of the coefficients. Each element of each bit-plane denotes zero or one as a binary numeral. For the signs of the quantized coefficients, −6 is the only negative value and the other coefficients denote zero or positive values. Accordingly, a sign bit-plane is as shown in FIG. 5C.

According to the EBCOT, each code-block having a predetermined size is coded while the statistic of coefficients in the code-block is being measured. The quantized coefficients are subjected to entropy coding every code-block. The bit-planes of each code-block are independently coded in order from the most significant bit (MSB) to the least significant bit (LSB). The size of each code-block is expressed using a power of two between four and 256. Generally, 32×32, 64×64, 128×32 are used. Each quantized coefficient is expressed by n bits as signed binary numerals. Bits 0 to (n−2) represent respective bits from the LSB to the MSB. The remaining one bit represents a sign. Each code-block is coded in order from the bit-plane including the MSB by the following three kinds of coding passes (a) to (c).

Figure 6:
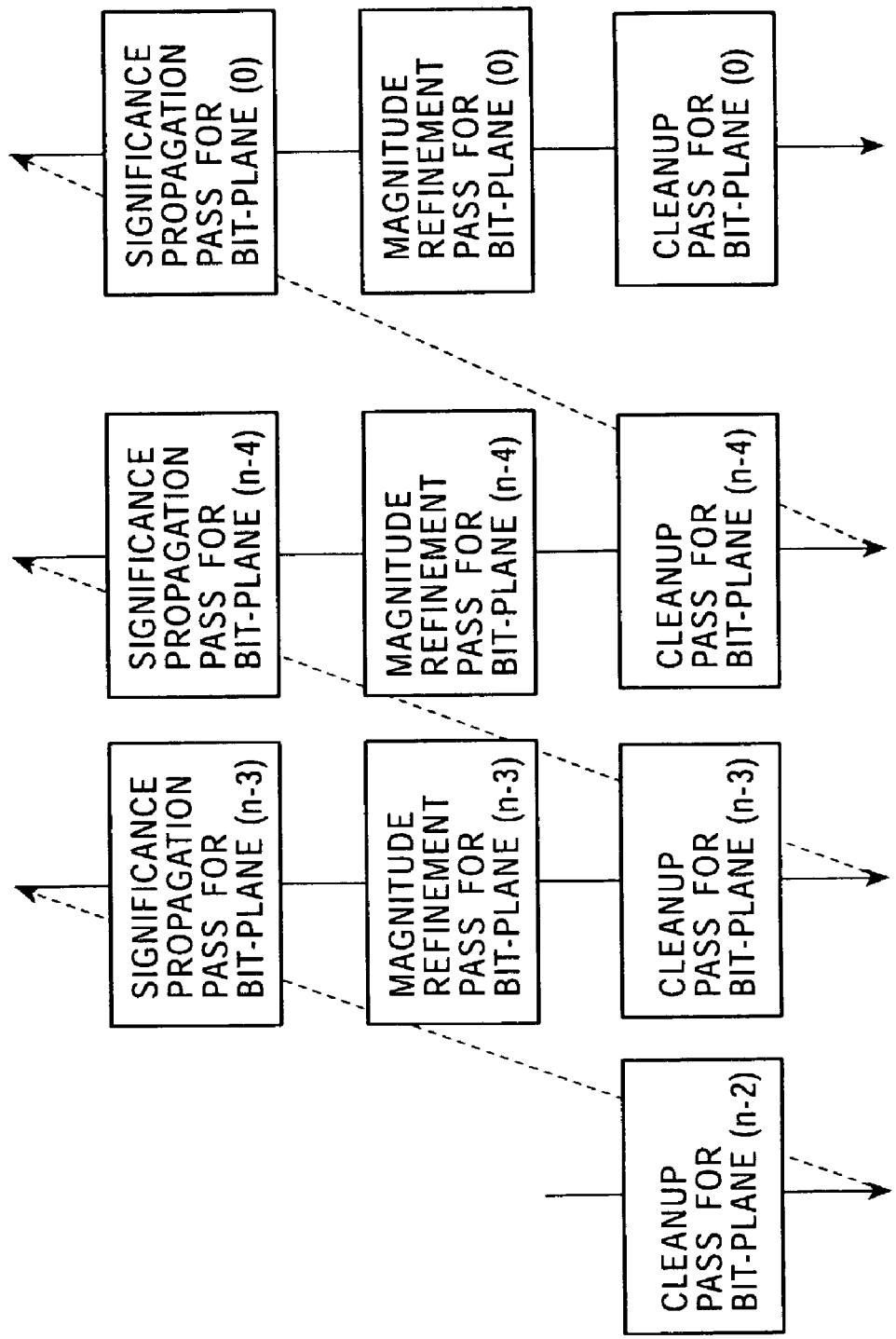
FIG. 6 is a diagram explaining a procedure of coding passes in each code block.

(a) Significance Propagation Pass
(b) Magnitude Refinement Pass
(c) Cleanup Pass FIG. 6 shows the order of using the three coding passes. Referring to FIG. 6, a bit-plane (n−2) (MSB) is first coded by the cleanup pass. After that, the respective bit-planes are coded in the order to the LSB using the significance propagation pass, the magnitude refinement pass, and the cleanup pass in this order.

Actually, what number is the bit-plane, where a bit representing one is first found, from the bit-plane including the MSB is written in a header. A bit-plane having all bits indicating zero is not coded. In this order, the bit-planes are coded repetitively using the three kinds of coding passes. After an arbitrary bit-plane is coded using an arbitrary coding pass, coding is aborted. Thus, trade-off between the bit-rate and the image quality can be obtained, namely, rate control can be achieved.

Figure 7:
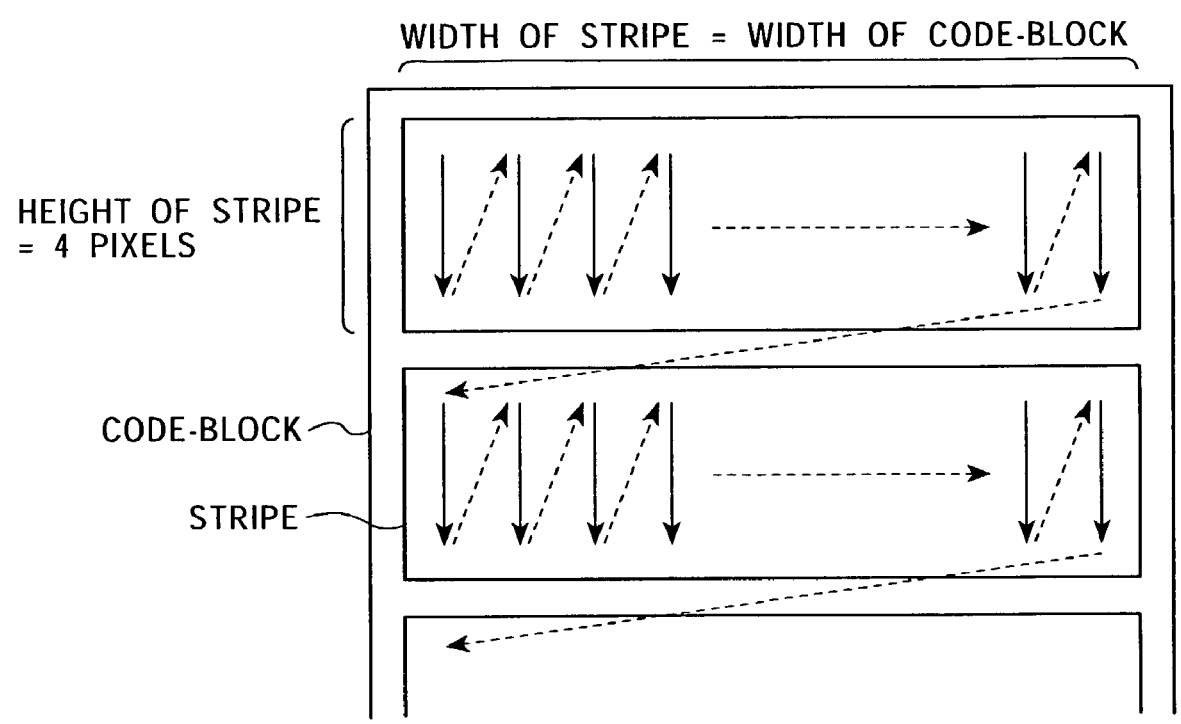
FIG. 7 is a diagram explaining scanning order of coefficients in each code block.

In this case, scanning coefficients will be described with reference to FIG. 7. Each code-block is divided into stripes each having four coefficients (pixels) serving as the height of each stripe. The width of the stripe is equivalent to the width of the code-block. Scanning order denotes the order of scanning all coefficients in one code-block. The scanning is performed in the following manner. In each code-block, the stripes are scanned from top to bottom. In each stripe, the coefficients are scanned every column from the left to the right. In each column, the coefficients are scanned from top to bottom. All coefficients in each code-block are processed in the scanning order in each coding pass.

The foregoing three coding passes will now be described hereinbelow.

(a) Significance Propagation Pass

In the significance propagation pass for coding an arbitrary bit-plane, the values of the bit-plane including insignificant coefficients in which at least one of eight neighbor coefficients is significant are arithmetically coded. When some coded coefficient in the bit-plane represents one as a binary numeral, a plus or minus sign thereof is arithmetically coded.

"Significance" means a state assigned to each coefficient by an encoder. The significance state is initialized to zero representing insignificant. When a coefficient representing one is coded, the significance state changes from zero to one (significant) and is then continuously held to one. Therefore, the significance is also called a flag indicating whether information having significant digit has been coded. When the significance propagation pass is generated in a certain bit-plane, the significance propagation pass is not generated in the subsequent bit-planes.

(b) Magnitude Refinement Pass

In the magnitude refinement pass, the values of a bit-plane including significant coefficients which are not coded in the significance propagation pass are arithmetically coded.

(c) Cleanup Pass

In the cleanup pass, the values of a bit-plane including insignificant coefficients which are not coded in the significance propagation pass are arithmetically coded. When any coded coefficient of the bit-plane indicates one, a plus or minus sign thereof is arithmetically coded.

In the arithmetic coding in the above three coding passes, ZC (Zero Coding), RLC (Run-Length Coding), SC (Sign Coding), and MR (Magnitude Refinement) are properly used depending on circumstances and the context of a coefficient is selected. The selected context is coded by arithmetic coding called MQ coding. The MQ coding is learning binary arithmetic coding defined in JBIG2. The MQ coding is disclosed in, for example, "ISO/IEC FDIS 14492, Lossy/Lossless Coding of Bi-level Images", March, 2000. JPEG-2000 includes 19 kinds of contexts in total in all the coding passes.

As mentioned above, the bit-plane coding-pass generation unit 14 divides the quantized coefficients D14 of each code-block into bit-planes and also divides each bit-plane into three groups for the three coding passes to generate quantized coefficients D15 every coding pass. The arithmetic coding unit 15 arithmetically codes the quantized coefficients D15 of each coding pass.

The rate control unit 17 counts a bit-rate of arithmetic codes D16 supplied from the arithmetic coding unit 15 after at least one part of the coding passes is processed. When the bit-rate reaches a target value, or just before the time, the rate control unit 17 truncates arithmetic codes D16 supplied thereafter. As mentioned above, the bit-rate can be suppressed to the target bit-rate with reliability by truncating the arithmetic codes just before the bit-rate exceeds the target bit-rate. The rate control unit 17 supplies arithmetic codes D17 subjected to the bit-rate control to the header generation unit 18 and the packet assembling unit 19.

On the basis of the arithmetic codes D17 subjected to the bit-rate control supplied from the rate control unit 17, the header generation unit 18 generates a header D18 using additional information in the code-block, for example, the number of coding passes in the code-block and the data length of a compressed code-stream and then supplies the header D18 to the packet assembling unit 19.

Figure 8:
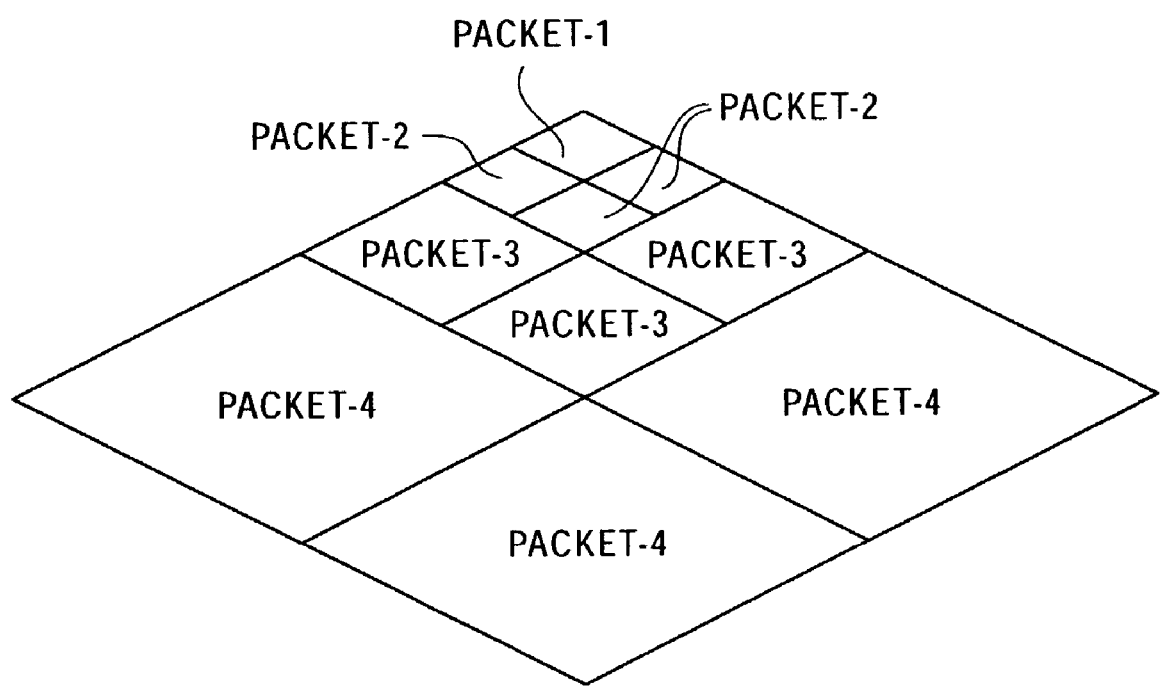
FIG. 8 is a diagram explaining packets generated in the image coding apparatus.

The packet assembling unit 19 combines the header D18 with the arithmetic codes D17 subjected to the bit-rate control to assemble a packet D19 and then outputs the packet D19 as an encoded code-stream. At this time, the packet assembling unit 19 generates various packets at the same resolution level as shown in FIG. 8. As will be understood from FIG. 8, packet-1 serving as the lowermost frequency component includes only the LL component. The other packets, namely, packets-2 to packets-4 include the LL components, the HL components, and the HH components.

As mentioned above, according to the present embodiment, the image coding apparatus 1 can compress and code an input image at high efficiency using the wavelet transform and the entropy coding to generate packets and then output the packets as encoded code-streams.

As described above, JPEG-2000 is suitable for still images. In JPEG-2000, support for interlaced images which are often found in moving images is not studied enough. Disadvantageously, when techniques for still images are applied to moving images, the image quality is noticeably degraded. This disadvantage will now be described concretely.

Figure 9:
FIG. 9 shows an example of an interlaced moving image.

FIG. 9 shows one frame of one scene of interlaced moving images. When the frame is displayed on a progressive type monitor such as a PC monitor, a portion having motion is strongly influenced due to interlacing. Thus, stripes are found in the lateral direction.

Figure 10A:
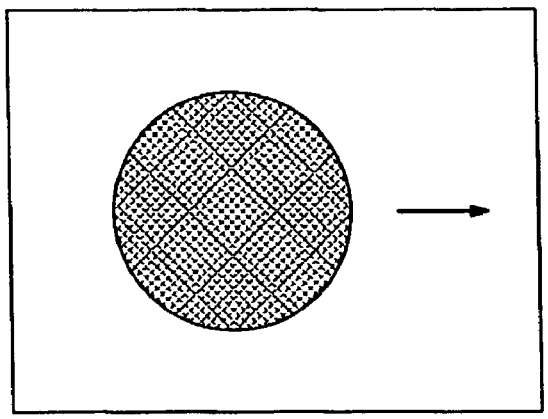
FIGS. 10A and 10B are diagrams explaining the vision of an object in an interlaced image, FIG. 10A showing a case where the object moves to the right in a screen and FIG. 10B showing the vision of the object in a progressive screen.
Figure 10B:
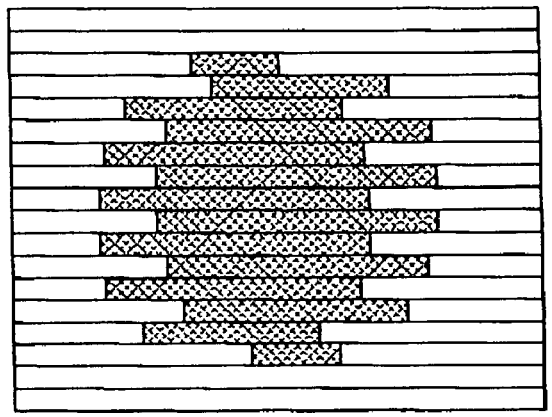

In other words, when a round object moves to the right in a screen, there is no problem on an interlaced screen as shown in FIG. 10A. However, stripes are noticeably found in the lateral direction on a progressive screen as shown in FIG. 10B. The stripes are caused due to the fact that the interlaced screen uses interlaced scanning between odd fields and even fields.

Figure 11:
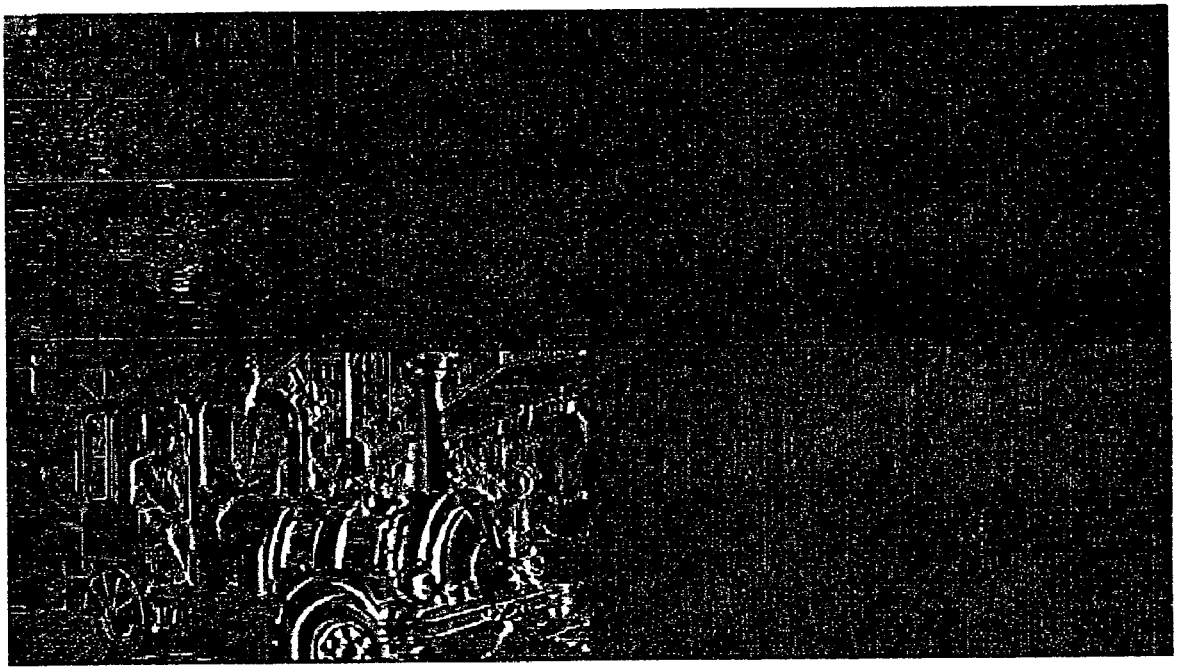
FIG. 11 is a diagram explaining subbands generated by performing the wavelet decomposition to the interlaced image.

The image shown in FIG. 9 is subjected to the wavelet decomposition five times to generate subbands. FIG. 11 shows the states of the subbands. As will be understood from FIG. 11, it is clear that the energy of coefficients of the LH-1 component, namely, the subband comprising the highest frequency component and comprising a horizontal low frequency component and a vertical high frequency component is larger than those of the other subbands.

Figure 12:
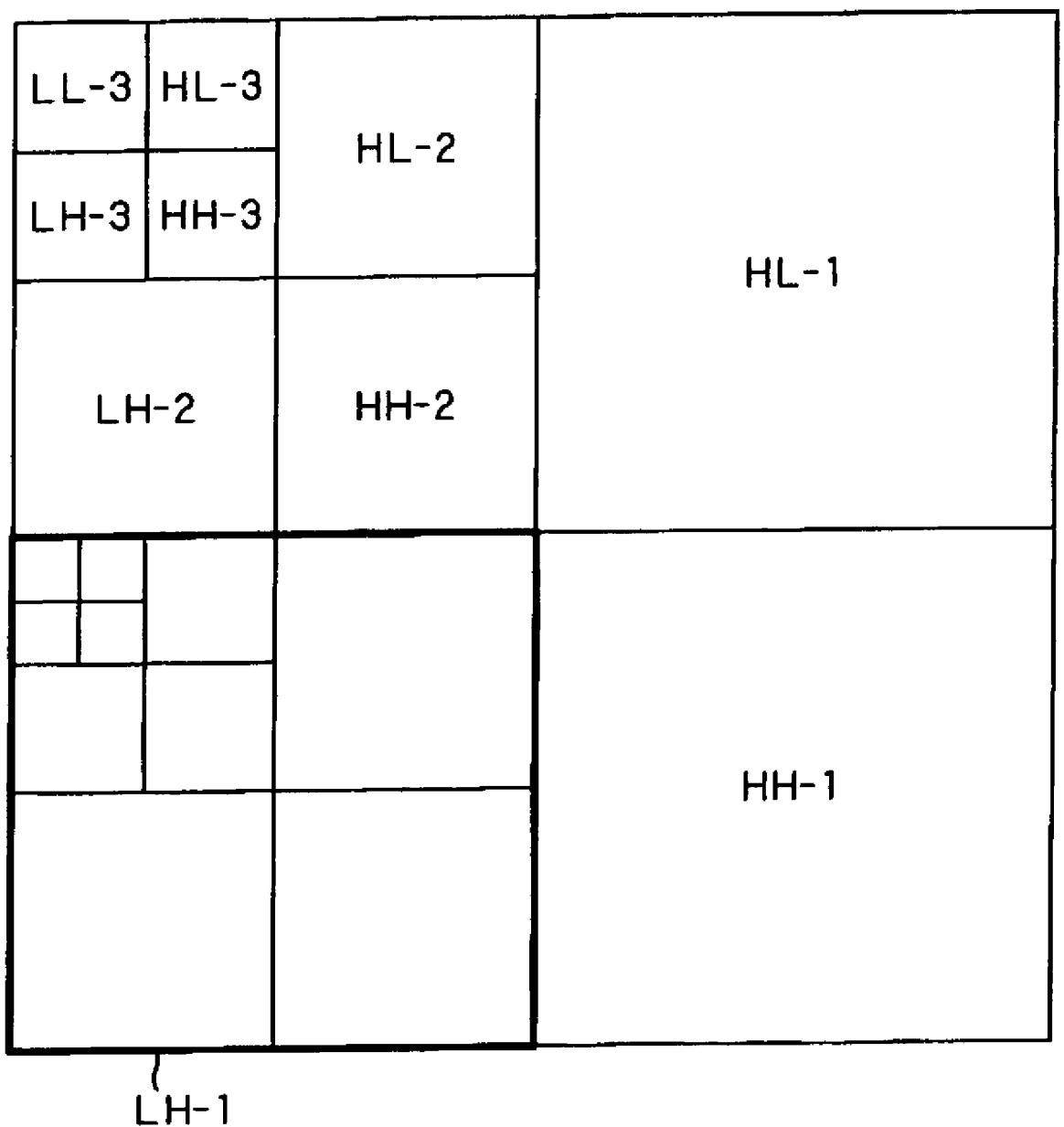
FIG. 12 is a diagram explaining subbands when an LL component and an LH component are hierarchically subjected to the wavelet decomposition.

According to the present embodiment, the wavelet transform unit 11 further performs the wavelet decomposition to the LH-1 component of an interlaced image using the characteristics of the input image as shown in FIG. 12. The component to be subjected to the wavelet decomposition is not limited to the LH-1 component. It is a matter of course that the LH-2 component or another component is effectively subjected to the wavelet decomposition in the same manner.

In this case, since it is generally clear before coding that the input image is an interlaced image, some LH component can be further subjected to the wavelet decomposition as mentioned above. After the distribution of coefficients of subbands generated by the wavelet decomposition is observed, a subband having large energy (in case of the interlaced image, some LH component) can be further subjected to the wavelet decomposition. Thus, the compressibility can be increased.

When the input image is a color image, the properties of the human visual system can be used. The properties of the human visual system are insensitive to color difference components as compared with a luminance component. In other words, when the subband is filtered to be decomposed as mentioned above, different processes can be performed to the input image comprising the luminance component and the input image comprising the color difference components. For example, for the luminance component, a subband comprising a low frequency component is hierarchically filtered to be decomposed into subbands and a subband comprising a horizontal low frequency component and a vertical high frequency component is also filtered to be decomposed into subbands. On the other hand, for the color difference components, a subband comprising a low frequency component alone is hierarchically filtered to be decomposed into subbands. Thus, the compressibility can be increased using the properties of the human visual system while a degradation in image quality is being suppressed.

(1-2) First Modification

According to the above embodiment, the size of the code-block in the code-block generation unit 13 is set to, for example, 64×64. In JPEG-2000, (dimension in the horizontal direction)×(dimension in the vertical direction) is equal to or less than 4096 and the size can be an integer power of two.

As shown in FIG. 4, all of the code-blocks have the same size in all the subbands. Accordingly, this fact affects the coding efficiency and the image quality. In JPEG-2000, in order to reconstruct an image, the image is decoded using inverse wavelet transform. A distortion and noises in a low frequency component results in a large degradation in image quality during the inverse wavelet transform. Therefore, if a degradation in image quality can be restricted to a small area, the possibility that the restriction contributes to image enhancement may be increased.

According to a first modification of the present embodiment, in the case of an interlaced input image, the smaller size of a code-block than that of a progressive image, for example, 32×32 is effectively used. Particularly, since the interlaced image has a low correlation in the vertical direction, 64×32 or 128×16 for an elongated form is effectively set as the size of each code-block.

The size of each code-block for the luminance component and that for the color difference components can be different from each other. For example, a degradation in image quality is noticeable in the input image comprising the luminance component from the viewpoint of the properties of the human visual system. Accordingly, the size of each code-block is set to a small size of 32×32, 64×32, or 128×16. For the color difference components in which a degradation is not so noticeably found, the size of each code-block can be set to 64×64.

(1-3) Second Modification

According to the above first modification, the size of each code-block is variably set in accordance with the characteristics of an input image. According to a second modification of the present embodiment, a rectangular area containing code-blocks is determined. In JPEG-2000, the rectangular area is called a precinct. The size of each precinct is determined as follows. In this instance, PPx and PPy are defined by markers.

Precinct H=2^PPx (horizontal dimension)
Precinct V=2^PPy (vertical dimension)

The size of each code-block is determined by the following equations.

Code-block size (in the horizontal direction)=2^xcb'
Code-block size (in the vertical direction)=2^ycb'

$$xcb'=\min(xcb, PPx-1), \text{ for } r>0 \quad (1)$$

$$xcb'=\min(xcb, PPx), \text{ for } r>0 \quad (2)$$

$$ycb'=\min(ycb, PPy-1), \text{ for } r>0 \quad (3)$$

$$ycb'=\min(ycb, PPy), \text{ for } r>0 \quad (4)$$

Reference symbol r denotes a resolution level after wavelet decomposition. Each of reference symbols xcb and ycb denotes the initially designated size of a code-block. For example, when the size of the code-block is initially set to 64×64 (=$2^6 \times 2^6$), xcb=ycb=6.

Figure 13:
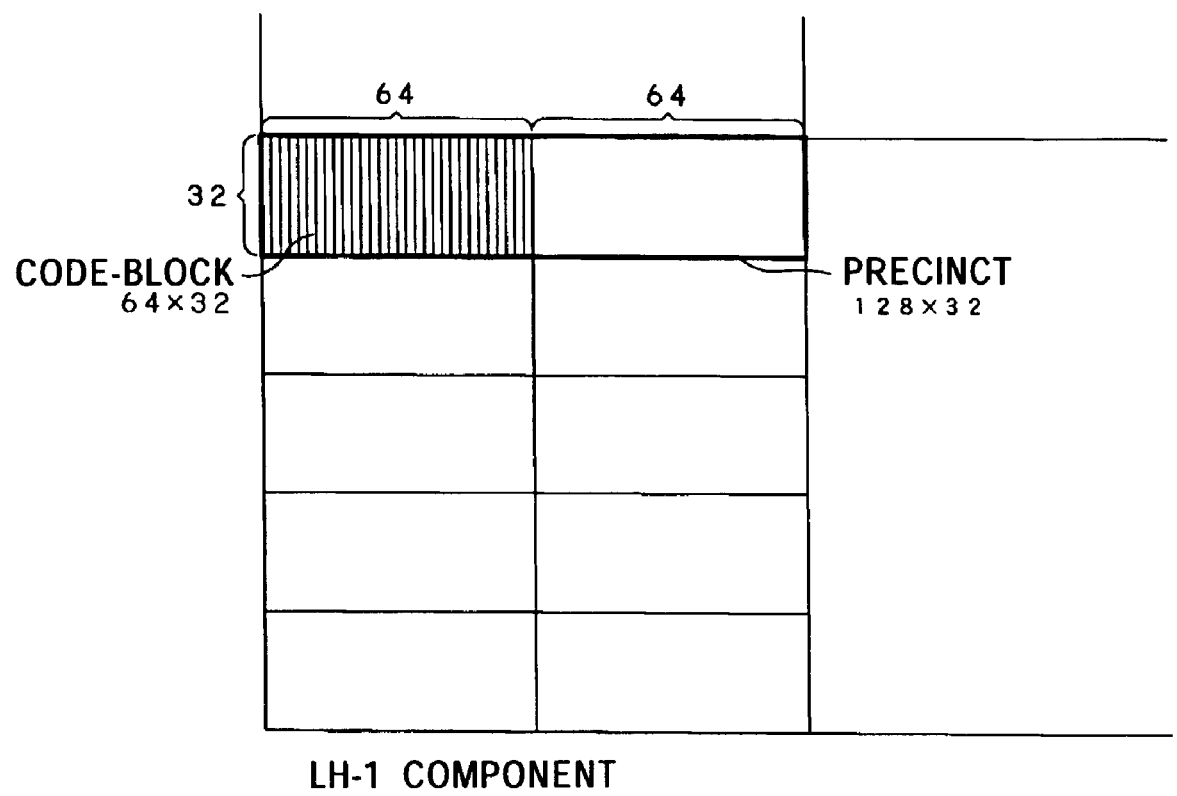
FIG. 13 is a diagram explaining the size of each code as compared with the size of each precinct.

As shown in the above equations (1) to (4), the size of the code-block is determined on the basis of the relationship with the size of the precinct. The code-block cannot be larger than the precinct. FIG. 13 shows the relationship therebetween. Referring to FIG. 13, the size of each precinct is set to 128×32 and the size of each code-block contained in the precinct is set to 64×32.

In JPEG-2000, precincts having different sizes can be defined at each resolution level generated in the process of the wavelet decomposition using a SPcod marker.

Figure 14:
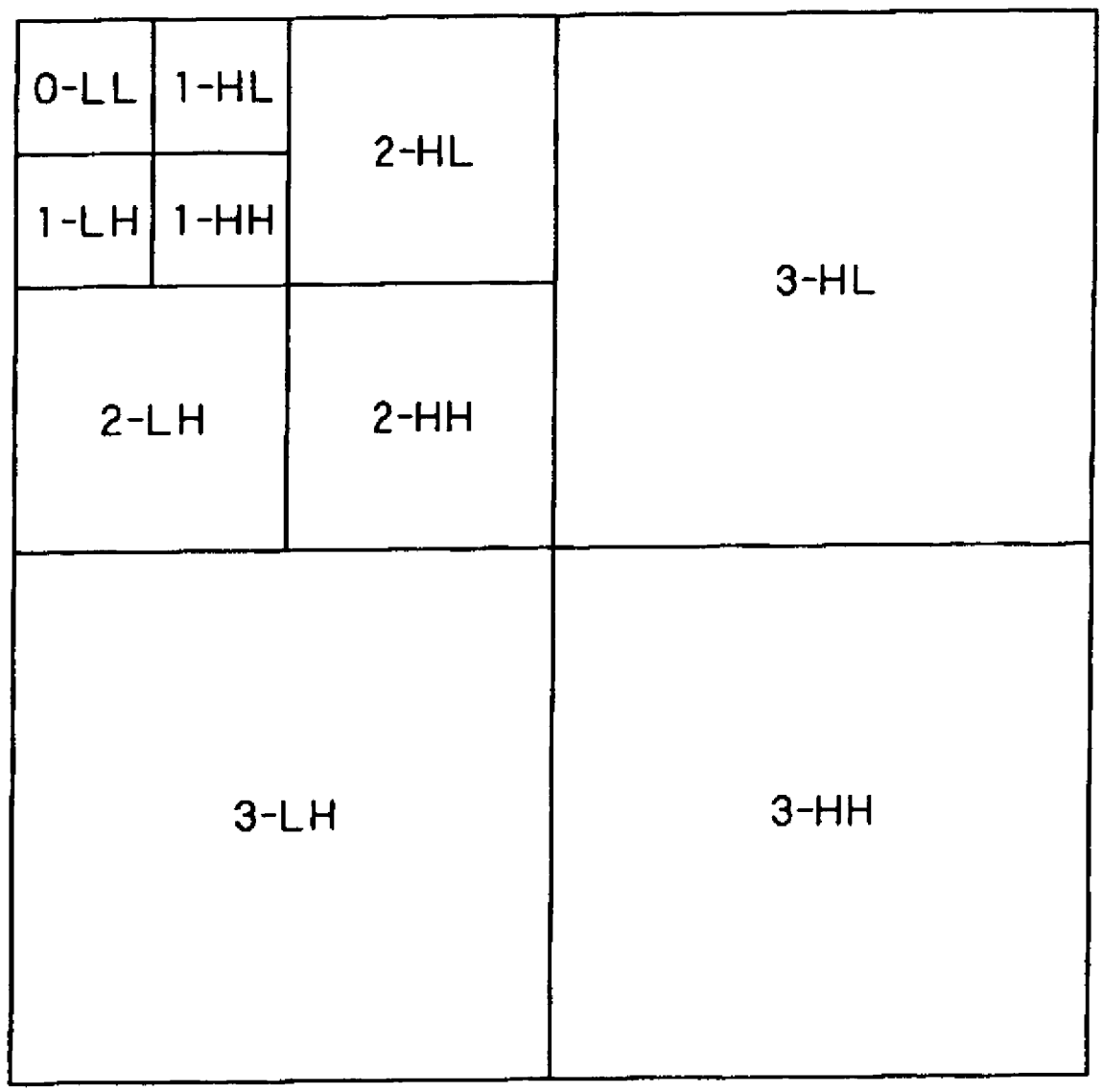
FIG. 14 is a diagram explaining resolution level numbers.

The resolution levels will now be described with reference to FIG. 14. FIG. 14 shows a case of the decomposition level 3 in the wavelet transform. In this case, 0-LL denotes the lowermost frequency component. 1-HL, 1-LH, and 1-HH denote the frequency components higher than 0-LL. 2-HL, 2-LH, and 2-HH denote the frequency components higher than 1-HL, 1-LH, and 1-HH. 3-HL, 3-LH, and 3-HH denote the highest frequency components. When the resolution level is described, N designates the level number of the resolution level such as N-LH.

In consideration of the cases shown in FIGS. 13 and 14, for example, the size of each precinct in a subband serving as the 1-LH component can be set to 128×16 and the size of each precinct in a subband serving as the 2-LH component can be set to 128×32.

Accordingly, when subbands have different energy distributions of coefficients, the size of each precinct can be varied, so that the size of each code-block can be varied. Thus, the quality of a coded image can be increased.

In the case of the interlaced image, the energy easily concentrates on the LH components as mentioned above. Accordingly, when the size of each precinct in a subband comprising a horizontal low frequency component and a vertical high frequency component is set smaller than those of the other subbands, it is effective. At this time, when it is assumed that one precinct is equivalent to one code-block, the rectangular area in the subband represents the code-block.

The size of each precinct of the input image comprising the luminance component can be different from that of the input image comprising the color difference components. Generally, when the size of each precinct of the input image comprising the color difference components in which a degradation in image quality is not so noticeable is set to be larger than that of the input image comprising the luminance component, it is effective.

(1-4) Third Modification

According to a third modification of the present embodiment, the operation of the rate control unit 17 (refer to FIG. 1) will now be described in detail. According to the embodiment, the coding pass is truncated or the subsequent coding passes are not selected and truncated when the bit-rate reaches the target bit-rate or just before the bit-rate reaches the target bit-rate, thus achieving the rate control. According to the third modification, an internal process of the rate control unit 17 will be described hereinbelow with reference to FIG. 15.

Figure 15:
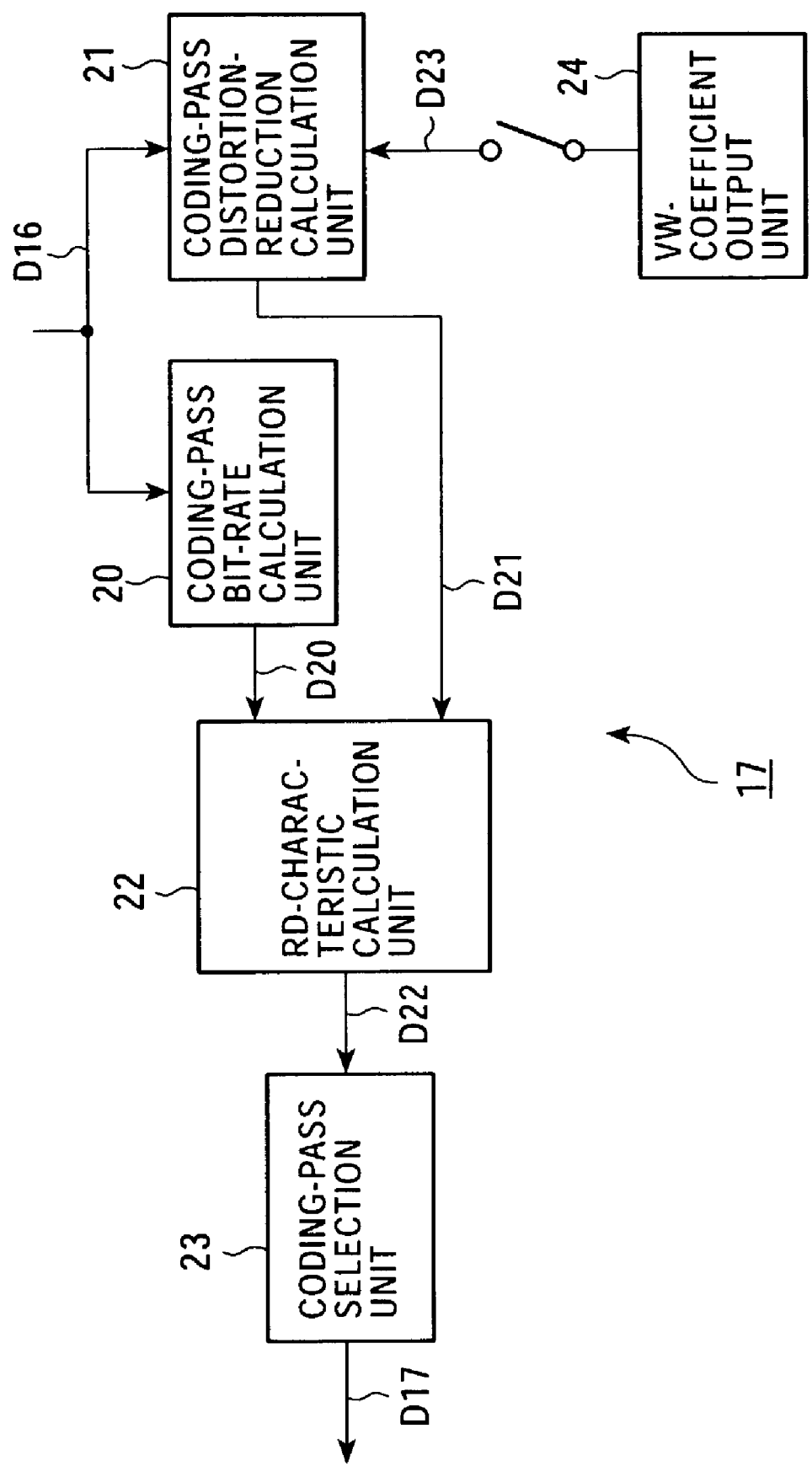
FIG. 15 is a diagram explaining a rate control unit using RD characteristic.

Referring to FIG. 15, the arithmetic codes D16 subjected to the arithmetic coding are supplied to a coding-pass bit-rate calculation unit 20 and a coding-pass distortion-reduction calculation unit 21. The coding-pass bit-rate calculation unit 20 obtains a bit-rate R, which is actually generated in each coding pass generated in each code-block, for each coding pass of each code-block and then supplies information D20 indicative of the bit-rate R of each coding pass of each code-block to an RD-characteristic calculation unit 22.

Similarly, the coding-pass distortion-reduction calculation unit 21 obtains distortion reduction D indicating the extent to which distortion is reduced during the coding pass every coding pass of each code-block and then supplies information D21 indicative of the distortion reduction D of each coding pass of each code-block to the RD-characteristic calculation unit 22.

The RD-characteristic calculation unit 22 calculates the RD characteristics of each coding pass, generally, the gradient of the RD characteristic curve. The RD-characteristic calculation unit 22 stores the obtained RD-characteristic values and the information D22 of all the coding passes and also supplies the RD characteristic values and the information D22 of the coding passes to a coding-pass selection unit 23.

Figure 16:
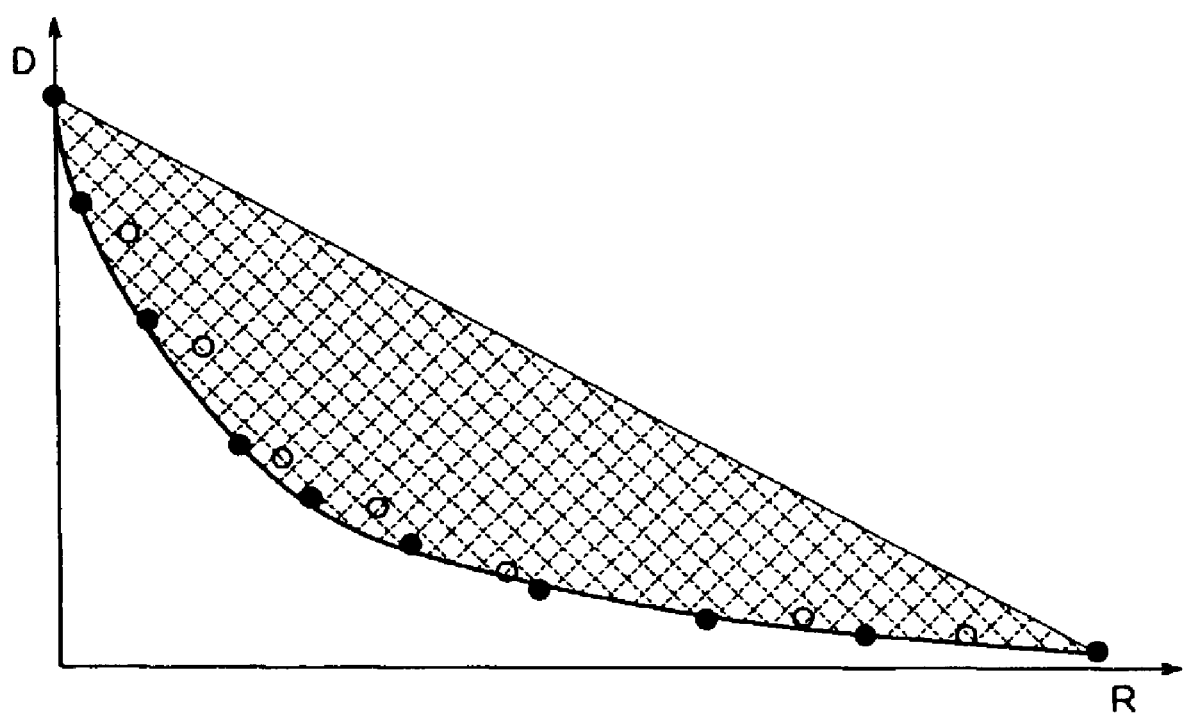
FIG. 16 is a graph explaining the RD characteristic.

On the basis of the RD-characteristic values and the information D22 regarding the coding passes supplied from the RD-characteristic calculation unit 22, the coding-pass selection unit 23 determines whether each coding pass is included or truncated so that the bit-rate is set the closest to the target bit-rate of the whole image. At this time, the coding-pass selection unit 23 uses the RD characteristic shown in FIG. 16. Referring to FIG. 16, each black circular point denotes a coding pass serving as a candidate to be truncated and each open circular point denotes non-target coding pass. Therefore, the coding-pass selection unit 23 selects the coding passes shown by the open circles so that the bit-rate is set the closest to the target bit-rate. The arithmetic codes D17 serving as information regarding the coding passes finally selected by the above operation are supplied to the header generation unit 18 and the packet assembling unit 19.

Coding techniques of JPEG-2000 include a visual weighting method. This method skillfully uses the human visual system, models fluctuated sensitivities of the human visual system for spatial frequencies of an image, and then systematizes the model as a contrast sensitivity function (CSF). Actually, the weight of the CSF is determined on the basis of the visual frequencies of transformed coefficients of an image. The weight of the CSF is prepared for each subband subjected to the wavelet transform. The weight of the CSF is designed on the coding side and depends on what conditions is a reconstructed image viewed under.

Figure 17:
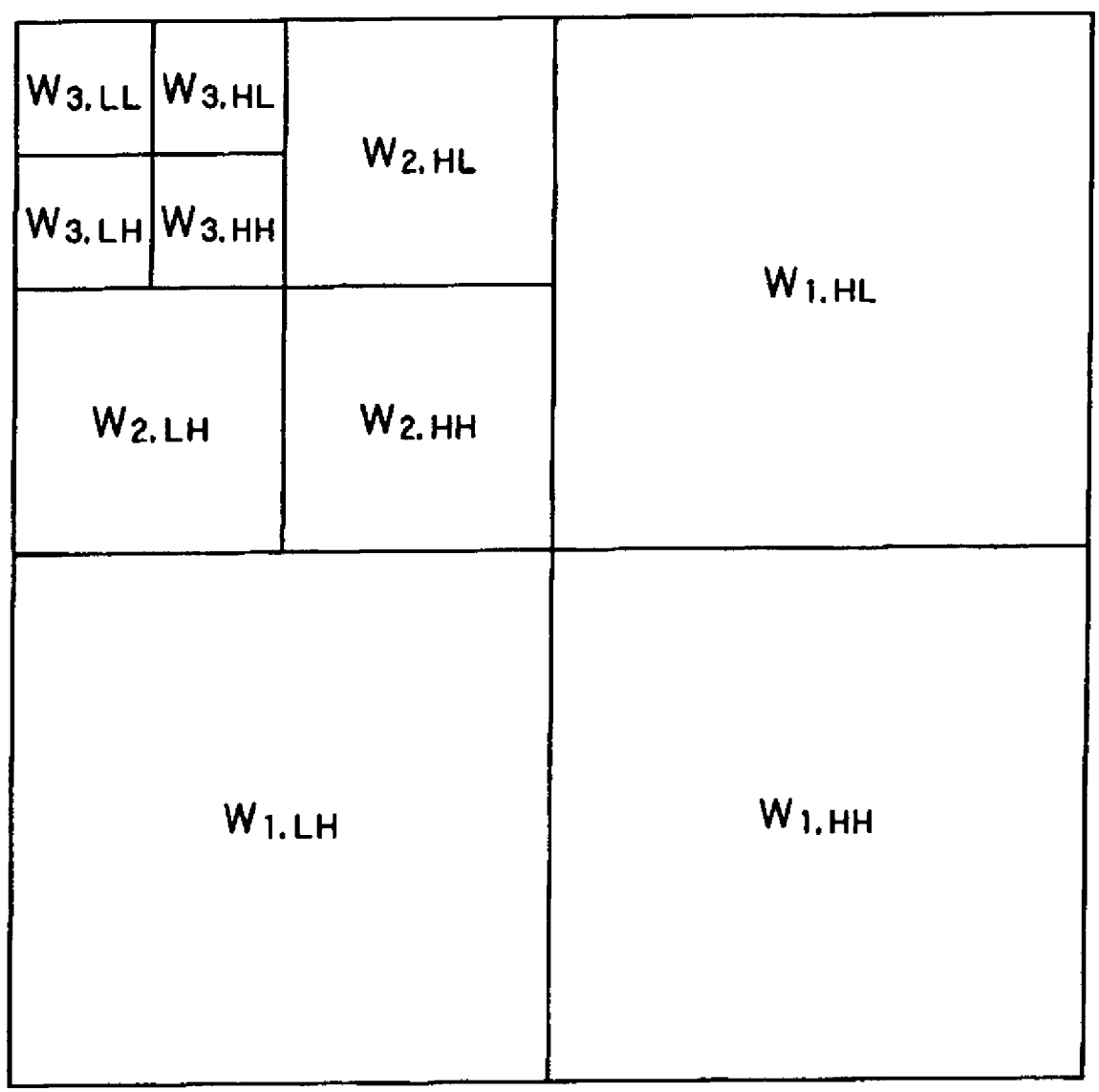
FIG. 17 is a diagram explaining the concept of weighting coefficients in a visual weighting method.

Referring to FIG. 15, a VW-coefficient output unit 24 supplies VW (visual weighting) coefficient values D23 to the coding-pass distortion-reduction calculation unit 21. The coding-pass distortion-reduction calculation unit 21 calculates the distortion reduction D based on the VW coefficient values D23. Specifically, as shown in FIG. 17, the VW coefficient value D23 is set every subband generated by the wavelet decomposition. The VW-coefficient output unit 24 stores the coefficient values.

The actual VW coefficient value D23 can be determined every subband at each decomposition level as shown in FIG. 18. As shown in FIG. 18, different coefficient values are set to the luminance component (Y) and the color difference components (Cb, Cr). It is understood that the larger the decomposition level, namely, the lower the frequency component, the larger the coefficient value. In this instance, the large coefficient value means that it is hard to truncate the coding pass during the rate control. In FIG. 18, the lower the frequency component of each of Y, Cb, and Cr (the larger the decomposition level), the larger the coefficient value. The reason is that the energy of the image concentrating on the low frequency components is used as mentioned above.

The coding-pass distortion-reduction calculation unit 21 sets a resultant value obtained by multiplying the distortion reduction D of each coding pass by the VW coefficient value D23 as new distortion reduction D. The multiplication is equivalent to preferential weighting for each subband. During the rate control, it is hard to truncate a coding pass existing in a subband comprising a low frequency component and, on the contrary, it is easy to truncate a coding pass existing in a subband comprising a high frequency component.

The coefficient value of a specific subband can be set to a large or small value using the characteristics of an input image. For example, when the input image is an interlaced image, the energy of the LH components trends to be large as mentioned above. Accordingly, as shown in FIG. 19, increasing weighting values of the coefficients corresponding to the LH components is effective. Consequently, an image having an interlaced component is maintained, resulting in an increase in image quality.

In FIGS. 18 and 19, the values of the weighting coefficients of Y are set smaller than those of Cb and Cr. The setting reflects the properties of the human visual system in which the human visual system for the color difference components is not sensitive as compared with that for the luminance component.

(2) Configuration and Operation of Image Decoding Apparatus

Figure 20:
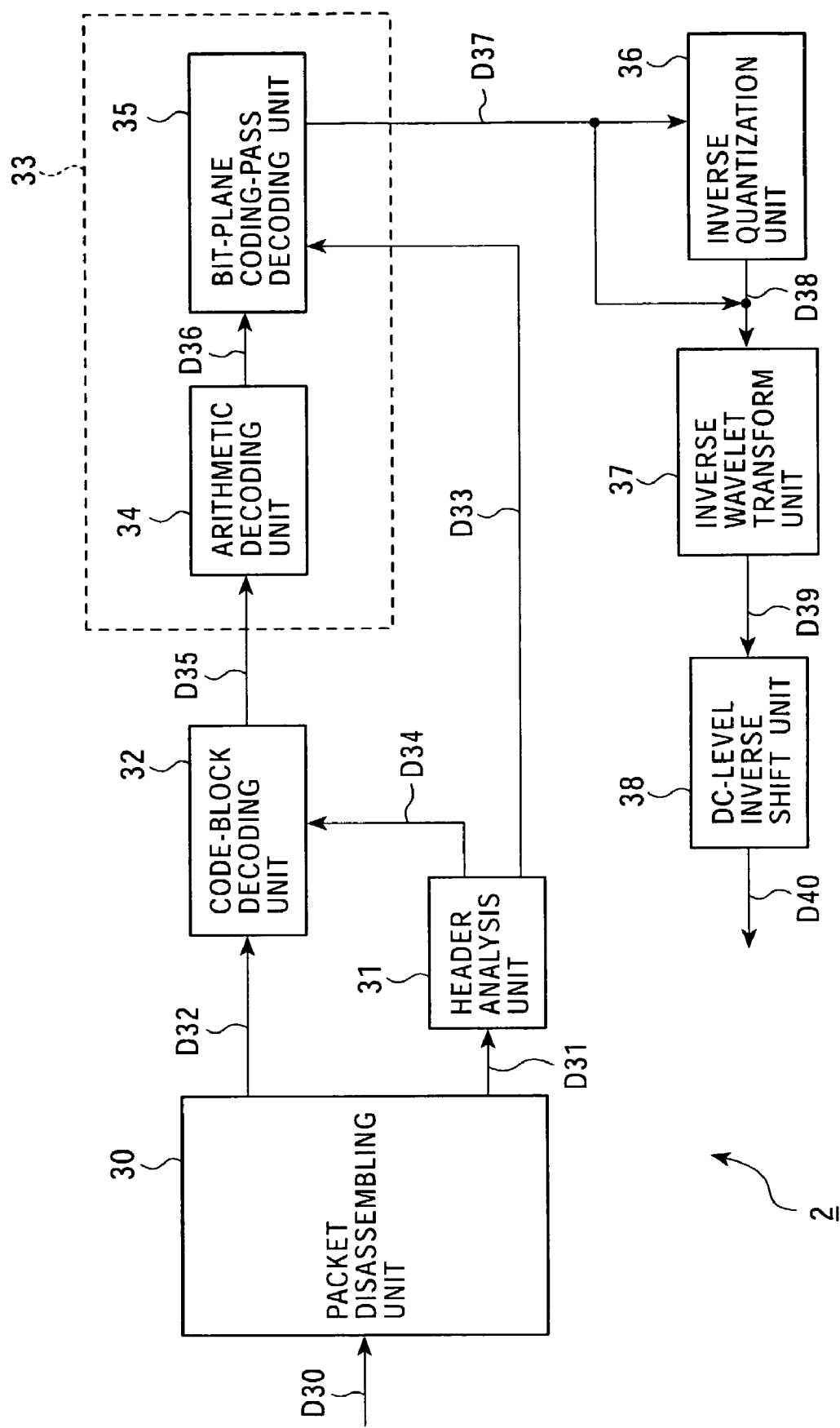
FIG. 20 is a schematic block diagram showing the configuration of an image decoding apparatus according to the present embodiment.

FIG. 20 schematically shows the configuration of an image decoding apparatus according to the present embodiment. Referring to FIG. 20, an image decoding apparatus 2 comprises a packet disassembling unit 30, a header analysis unit 31, a code-block decoding unit 32, an arithmetic decoding unit 34, a bit-plane coding-pass decoding unit 35, an inverse quantization unit 36, an inverse wavelet transform unit 37, and a DC-level inverse shift unit 38. An EBCOT decoding unit 33 is composed of the arithmetic decoding unit 34 and the bit-plane coding-pass decoding unit 35.

The packet disassembling unit 30 receives encoded code-streams D30 and then decomposes each code-stream D30 into a packet header D31 and a packet body D32. The packet body D32 contains the actual encoded code-stream. The packet disassembling unit 30 supplies the packet header D31 to the header analysis unit 31 and also supplies the packet body D32 to the code-block decoding unit 32.

The header analysis unit 31 analyzes the packet header D31 and then supplies information D33 regarding the coding passes such as the number of coding passes in the code-block and the bit-rate generated in the coding passes to the bit-plane coding-pass decoding unit 35. The header analysis unit 31 also supplies positional information D34 of the code-block to the code-block decoding unit 32.

The code-block decoding unit 32 supplies an encoded code-stream D35 of each code-block to the arithmetic decoding unit 34.

The arithmetic decoding unit 34 arithmetically decodes the encoded code-stream D35 of each code-block to generate coefficient information D36. The bit-plane coding-pass decoding unit 35 performs a bit demodeling process. The bit-plane coding-pass decoding unit 35 reconstructs binary data of each bit-plane from the coefficient information D36. Actually, each binary data represents a quantized coefficient D37. The bit-plane coding-pass decoding unit 35 supplies the quantized coefficients D37 to the inverse quantization unit 36.

The inverse quantization unit 36 inversely quantizes the quantized coefficients D37 supplied from the bit-plane coding-pass decoding unit 35 into wavelet transform coefficients D38. As mentioned above, when the image coding apparatus 1 uses the irreversible 9×7 wavelet transform filter, the coefficients are quantized. Accordingly, the coefficients are inversely quantized by the inverse quantization unit 36. On the other hand, when the image coding apparatus 1 uses the reversible 5×3 wavelet transform filter, quantization is omitted. Therefore, the binary data of each bit-plane is directly supplied from the bit-plane coding-pass decoding unit 35 to the inverse wavelet transform unit 37. In JPEG-2000, whether quantization has been performed in the image coding apparatus 1 can be determined by a marker in the encoded code-stream D30.

The inverse wavelet transform unit 37 inversely transforms the wavelet transform coefficients D38 to generate a decoded image D39 and then supplies the decoded image D39 to the DC-level inverse shit unit 38.

If the image has been subjected to the DC-level shift process in the image coding apparatus 1, the DC-level inverse shift unit 38 performs an inverse shift process to the decoded image D39 and then outputs a decoded image D40 serving as the resultant image.

For example, when an input image is an interlaced image, a subband comprising the highest frequency component and comprising a horizontal low frequency component and a vertical high frequency component is further subjected to the wavelet decomposition. In this case, when subbands each comprising the low frequency component are hierarchically subjected to inverse wavelet transform for composition, the subband comprising a horizontal low frequency component and a vertical high frequency component is further subjected to the inverse wavelet transform for composition.

In the image coding apparatus 1, during the filtering and decomposition process for subbands, different processes are performed to the input image comprising the luminance component and the input image comprising the color difference components. In this case, during the inverse wavelet transform for composition, different processes are performed to encoded code-streams of the luminance component and those of the color difference components.

In the case where an image is coded using precincts described in the foregoing second modification, a plurality of code-blocks are composed into each precinct, the precincts are composed into each subband, and coefficients of the subbands are subjected to the inverse wavelet transform to be composed into an image. At this time, in the case where the size of each precinct for the luminance component is different from that for the color difference components and an image is coded using the different precincts in the image coding apparatus 1, when encoded code-streams are decoded, the size of each precinct for the luminance component is also made different from that for the color difference components.

(3) Other

As mentioned above, in the image coding apparatus 1 according to the present embodiment, the characteristics of an input image is considered. For example, when the input image is an interlaced image, the fact that the energy of coefficients of a subband comprising the highest frequency component and comprising a horizontal low frequency component and a vertical high frequency component is larger than those of the other subbands is used. The subband is further subjected to the wavelet transform. In consideration of the characteristics of an input image such as an interlaced image, the size of each code-block included in a subband comprising a horizontal low frequency component and a vertical high frequency component and the size of each precinct containing the code-blocks are set to be small. Furthermore, a weighting coefficient for each subband according to the visual weighting method is used. For example, when an input image is an interlaced image, the weighting coefficient for a subband comprising a horizontal low frequency component and a vertical high frequency component is set to a large value so that it is hard to truncate a coding pass during the rate control.

According to the image coding apparatus and its method of the present invention, using the above-mentioned techniques, rough motion of an object due to distortion between odd fields and even fields serving as a disadvantage in the interlaced image can be suppressed or avoided, resulting in an increase in the subjective image quality.

The above techniques are properly used for the luminance component and the color difference components. Thus, a degradation in the image quality can be suppressed and the compressibility can be increased using the properties of the human visual system.

According to the present embodiment, in the image decoding apparatus 2, input encoded code-streams can be decoded by processes corresponding to those in the image coding apparatus 1.

According to the image decoding apparatus and its method of the present invention, a code-stream encoded so that rough motion of an object is suppressed or avoided can be decoded, the rough motion being caused due to distortion between odd fields and even fields serving as a disadvantage in the interlaced image.

The present invention is not limited to the foregoing embodiment but many modifications and variations are possible without departing from the spirit and the scope of the present invention.

In the foregoing embodiment, the configuration of hardware has been described as an example. The present invention is not limited to the example. The process in the image coding apparatus 1 and the process in the image decoding apparatus 2 can be realized by permitting a CPU to execute a computer program. In this case, the computer program can be recorded in a recording medium and be then provided. The computer program can also be transmitted through the Internet and other transmission media.

Using the program and the recording medium, the image coding process and the image decoding process are realized by software, so that rough motion of an object can be suppressed or avoided, the rough motion being caused due to distortion between odd fields and even fields serving as a disadvantage in the interlaced image. Thus, the subjective image quality can be increased.

What is claimed is:

1. An image coding apparatus comprising:
   filtering means for low-pass filtering and high-pass filtering an input image in the vertical and horizontal directions to generate subbands and then hierarchically filtering a subband comprising a low frequency component;
   code-block generating means for decomposing each subband generated by the filtering means into code-blocks each having a predetermined size;
   bit-plane generating means for generating bit-planes including bits from the most significant bit to the least significant bit every code-block;
   coding pass generating means for generating coding passes every bit-plane;
   arithmetic coding means for performing arithmetic coding in the coding passes;
   bit-rate control means for controlling a bit-rate to a target bit-rate on the basis of generated arithmetic codes; and
   packet assembling means for adding a header to the arithmetic codes subjected to the bit-rate control to assemble a packet, wherein
   the filtering means further filters a predetermined subband in consideration of the characteristics of the input image.

2. An apparatus according to claim 1, wherein when the input image is an interlaced image, the filtering means further filters the predetermined subband.

3. An apparatus according to claim 2, wherein the predetermined subband comprises a horizontal low frequency component and a vertical high frequency component.

4. An apparatus according to claim 1, wherein while further filtering the predetermined subband, the filtering means performs different filtering processes to the input image comprising a luminance component and the input image comprising color difference components.

5. An apparatus according to claim 1, further comprising:
quantizing means for quantizing each coefficient of each subband generated by the filtering means, wherein
the code-block generating means divides the quantized coefficients obtained by the quantizing means into the code-blocks.

6. An image coding apparatus comprising:
filtering means for low-pass filtering and high-pass filtering an input image in the vertical and horizontal directions to generate subbands and then hierarchically filtering a subband comprising a low frequency component;
code-block generating means for decomposing each subband generated by the filtering means into code-blocks each having a predetermined size in consideration of the characteristics of the input image;
bit-plane generating means for generating bit-planes including bits from the most significant bit to the least significant bit every code-block;
coding pass generating means for generating coding passes every bit-plane;
arithmetic coding means for performing arithmetic coding in the coding passes;
bit-rate control means for controlling a bit-rate to a target bit-rate on the basis of generated arithmetic codes; and
packet assembling means for adding a header to the arithmetic codes subjected to the bit-rate control to assemble a packet.

7. An apparatus according to claim 6, wherein when the input image is an interlaced image, the code-block generating means sets each code-block to be smaller than that of a progressive image.

8. An apparatus according to claim 6, wherein while decomposing each subband into code-blocks each having a predetermined size, the code-block generating means generates the code-blocks of the input image comprising a luminance component and the code-blocks of the input image comprising color difference components, the size of each code-block for the luminance component being different from that for the color difference components.

9. An apparatus according to claim 6, further comprising:
rectangular area generating means for decomposing each subband generated by the filtering means into a plurality of rectangular areas using the characteristics of the input image, wherein
the code-block generating means generates the code-blocks each having a predetermined size every rectangular area.

10. An apparatus according to claim 9, wherein when the input image is an interlaced image, the rectangular area generating means sets each rectangular area in a predetermined subband to be smaller than those of the other subbands.

11. An apparatus according to claim 10, wherein the predetermined subband comprises a horizontal low frequency component and a vertical high frequency component.

12. An apparatus according to claim 9, wherein the rectangular area generating means generates the rectangular areas of the input image comprising a luminance component and the rectangular areas of the input image comprising color difference components, the size of each rectangular area for the luminance component being different from that for the color difference components.

13. An image coding apparatus comprising:
filtering means for low-pass filtering and high-pass filtering an input image in the vertical and horizontal directions to generate subbands and then hierarchically filtering a subband comprising a low frequency component;
code-block generating means for decomposing each subband generated by the filtering means into code-blocks each having a predetermined size;
bit-plane generating means for generating bit-planes including bits from the most significant bit to the least significant bit every code-block;
coding pass generating means for generating coding passes every bit-plane;
arithmetic coding means for performing arithmetic coding in the coding passes;
bit-rate control means for setting a predetermined weighting coefficient value every generated subband, and increasing the weighting coefficient value to preferentially encoding the coding passes in a specific subband or decreasing the weighting coefficient value to truncate the coding pass in the specific subband in order to control a bit-rate to a target bit-rate; and
packet assembling means for adding a header to arithmetic codes subjected to the bit-rate control to assemble a packet, wherein
when the input image is an interlaced image, the bit-rate control means sets the weighting coefficient value of a predetermined subband to a large value.

14. An apparatus according to claim 13, wherein the predetermined subband comprises a horizontal low frequency component and a vertical high frequency component.

15. An apparatus according to claim 13, wherein as the wavelet transform level of the subband is smaller, the weighting coefficient value thereof is set to be smaller, and as the wavelet transform level of the subband is larger, the weighting coefficient value thereof is set to be larger.

16. An apparatus according to claim 13, wherein the weighting coefficient value for the input image comprising a luminance component is different from that for the input image comprising color difference components.

17. An image coding method comprising:
a filtering step of low-pass filtering and high-pass filtering an input image in the vertical and horizontal directions to generate subbands and then hierarchically filtering a subband comprising a low frequency component;
a code-block generating step of decomposing each subband generated by the filtering step into code-blocks each having a predetermined size;
a bit-plane generating step of generating bit-planes including bits from the most significant bit to the least significant bit every code-block;
a coding pass generating step of generating coding passes every bit-plane;
an arithmetic coding step of performing arithmetic coding in the coding passes;
a bit-rate control step of controlling a bit-rate to a target bit-rate on the basis of generated arithmetic codes; and
a packet assembling step of adding a header to the arithmetic codes subjected to the bit-rate control to assemble a packet, wherein in the filtering step, a predetermined subband is further filtered in consideration of the characteristics of the input image.

18. A method according to claim 17, wherein in the filtering step, when the input image is an interlaced image, the predetermined subband is further filtered.

19. A method according to claim 18, wherein the predetermined subband comprises a horizontal low frequency component and a vertical high frequency component.

20. An image coding method comprising:
a filtering step of low-pass filtering and high-pass filtering an input image in the vertical and horizontal directions to generate subbands and then hierarchically filtering a subband comprising a low frequency component;
a code-block generating step of decomposing each subband generated by the filtering step into code-blocks each having a predetermined size in consideration of the characteristics of the input image;
a bit-plane generating step of generating bit-planes including bits from the most significant bit to the least significant bit every code-block;
a coding pass generating step of generating coding passes every bit-plane;
an arithmetic coding step of performing arithmetic coding in the coding passes;
a bit-rate control step of controlling a bit-rate to a target bit-rate on the basis of generated arithmetic codes; and
a packet assembling step of adding a header to the arithmetic codes subjected to the bit-rate control to assemble a packet.

21. A method according to claim 20, wherein in the code-block generating step, when the input image is an interlaced image, each code-block is set to be smaller than that of a progressive image.

22. A method according to claim 20, further comprising:
a rectangular area generating step of decomposing each subband generated in the filtering step into a plurality of rectangular areas using the characteristics of the input image, wherein
in the code-block generating step, the code-blocks each having a predetermined size are generated every rectangular area.

23. A method according to claim 22, wherein in the rectangular area generating step, when the input image is an interlaced image, each rectangular area in a predetermined subband is set to be smaller than those of the other subbands.

24. A method according to claim 23, wherein the predetermined subband comprises a horizontal low frequency component and a vertical high frequency component.

25. An image coding method comprising:
a filtering step of low-pass filtering and high-pass filtering an input image in the vertical and horizontal directions to generate subbands and then hierarchically filtering a subband comprising a low frequency component;
a code-block generating step of decomposing each subband generated in the filtering step into code-blocks each having a predetermined size;
a bit-plane generating step of generating bit-planes including bits from the most significant bit to the least significant bit every code-block;
a coding pass generating step of generating coding passes every bit-plane;
an arithmetic coding step of performing arithmetic coding in the coding passes;
a bit-rate control step of setting a predetermined weighting coefficient value every generated subband, and increasing the weighting coefficient value to preferentially encoding the coding passes in a specific subband or decreasing the weighting coefficient value to truncate the coding pass in the specific subband in order to control a bit-rate to a target bit-rate; and
a packet assembling step of adding a header to arithmetic codes subjected to the bit-rate control to assemble a packet, wherein
in the bit-rate control step, when the input image is an interlaced image, the weighting coefficient value of a predetermined subband is set to a large value.

26. A method according to claim 25, wherein the predetermined subband comprises a horizontal low frequency component and a vertical high frequency component.

27. A method according to claim 25, wherein as the wavelet transform level of the subband is smaller, the weighting coefficient thereof is set to be smaller, and as the wavelet transform level of the subband is larger, the weighting coefficient thereof is set to be larger.

28. A computer-readable recording medium in which a program to allow a computer to execute a predetermined process is recorded, the program comprising:
a filtering step of low-pass filtering and high-pass filtering an input image in the vertical and horizontal directions to generate subbands and then hierarchically filtering a subband comprising a low frequency component;
a code-block generating step of decomposing each subband generated in the filtering step into code-blocks each having a predetermined size;
a bit-plane generating step of generating bit-planes including bits from the most significant bit to the least significant bit every code-block;
a coding pass generating step of generating coding passes every bit-plane;
an arithmetic coding step of performing arithmetic coding in the coding passes;
a bit-rate control step of controlling a bit-rate to a target bit-rate on the basis of generated arithmetic codes; and
a packet assembling step of adding a header to the arithmetic codes subjected to the bit-rate control to assemble a packet, wherein
in the filtering step, a predetermined subband is further filtered in consideration of the characteristics of the input image.

29. A recording medium according to claim 28, wherein in the filtering step, when the input image is an interlaced image, the predetermined subband is further filtered.

30. A recording medium according to claim 29, wherein the predetermined subband comprises a horizontal low frequency component and a vertical high frequency component.

31. A computer-readable recording medium in which a program to allow a computer to execute a predetermined process is recorded, the program comprising:
a filtering step of low-pass filtering and high-pass filtering an input image in the vertical and horizontal directions to generate subbands and then hierarchically filtering a subband comprising a low frequency component;
a code-block generating step of decomposing each subband generated in the filtering step into code-blocks each having a predetermined size in consideration of the characteristics of the input image;
a bit-plane generating step of generating bit-planes including bits from the most significant bit to the least significant bit every code-block;
a coding pass generating step of generating coding passes every bit-plane;

an arithmetic coding step of performing arithmetic coding in the coding passes;
a bit-rate control step of controlling a bit-rate to a target bit-rate on the basis of generated arithmetic codes; and
a packet assembling step of adding a header to the arithmetic codes subjected to the bit-rate control to assemble a packet.

32. A recording medium according to claim 31, wherein in the code-block generating step, when the input image is an interlaced image, each code-block is set to be smaller than that of a progressive image.

33. A recording medium according to claim 31, wherein the program further comprises:
a rectangular area generating step of decomposing each subband generated in the filtering step into a plurality of rectangular areas using the characteristics of the input image, wherein
in the code-block generating step, the code-blocks each having a predetermined size are generated every rectangular area.

34. A recording medium according to claim 33, wherein in the rectangular area generating step, when the input image is an interlaced image, each rectangular area of a predetermined subband is smaller than those of the other subbands.

35. A recording medium according to claim 34, wherein the predetermined subband comprises a horizontal low frequency component and a vertical high frequency component.

36. A computer-readable recording medium in which a program to allow a computer to execute a predetermined process is recorded, the program comprising:
a filtering step of low-pass filtering and high-pass filtering an input image in the vertical and horizontal directions to generate subbands and then hierarchically filtering a subband comprising a low frequency component;
a code-block generating step of decomposing each subband generated in the filtering step into code-blocks each having a predetermined size;
a bit-plane generating step of generating bit-planes including bits from the most significant bit to the least significant bit every code-block;
a coding pass generating step of generating coding passes every bit-plane;
an arithmetic coding step of performing arithmetic coding in the coding passes;
a bit-rate control step of setting a predetermined weighting coefficient value every generated subband, and increasing the weighting coefficient value to preferentially encoding the coding passes in a specific subband or decreasing the weighting coefficient value to truncate the coding pass in the specific subband in order to control a bit-rate to a target bit-rate; and
a packet assembling step of adding a header to arithmetic codes subjected to the bit-rate control to assemble a packet, wherein
in the bit-rate control step, when the input image is an interlaced image, the weighting coefficient value of a predetermined subband is set to a large value.

37. A recording medium according to claim 36, wherein the predetermined subband comprises a horizontal low frequency component and a vertical high frequency component.

38. A recording medium according to claim 36, wherein as the wavelet transform level of the subband is smaller, the weighting coefficient value thereof is set to be smaller, and as the wavelet transform level of the subband is larger, the weighting coefficient value thereof is set to be larger.

39. An image decoding apparatus comprising:
packet disassembling means for disassembling each encoded code-stream generated as a packet into a header and arithmetic codes;
decoding means for decoding the arithmetic codes;
coding pass decoding means for decoding coding passes every bit-plane;
code-block reconstructing means for reconstructing each code-block on the basis of bit-planes including bits from the most significant bit to the least significant bit;
subband generating means for composing the code-blocks into each subband; and
filtering means for hierarchically low-pass filtering and high-pass filtering a subband comprising a low frequency component in the vertical and horizontal directions, wherein
the filtering means further filters a subband comprising a horizontal low frequency component and a vertical high frequency component.

40. An apparatus according to claim 39, wherein the filtering means performs different filtering processes to each subband for a luminance component of an image and each subband for color difference components of the image.

41. An image decoding method comprising:
a packet disassembling step of disassembling each encoded code-stream generated as a packet into a header and arithmetic codes;
a decoding step of decoding the arithmetic codes;
a coding pass decoding step of decoding coding passes every bit-plane;
a code-block reconstructing step of reconstructing each code-block on the basis of the bit-planes including bits from the most significant bit to the least significant bit;
a subband generating step of composing the code-blocks into each subband; and
a filtering step of hierarchically low-pass filtering and high-pass filtering a subband comprising a low frequency component in the vertical and horizontal directions, wherein
in the filtering step, a subband comprising a horizontal low frequency component and a vertical high frequency component is further filtered.

42. A computer-readable recording medium in which a program to allow a computer to execute a predetermined process is recorded, the program comprising:
a packet disassembling step of disassembling each encoded code-stream generated as a packet into a header and arithmetic codes;
a decoding step of decoding the arithmetic codes;
a coding pass decoding step of decoding coding passes every bit-plane;
a code-block reconstructing step of reconstructing each code-block on the basis of the bit-planes including bits from the most significant bit to the least significant bit;
a subband generating step of composing the code-blocks into each subband; and
a filtering step of hierarchically low-pass filtering and high-pass filtering a subband comprising a low frequency component in the vertical and horizontal directions, wherein
in the filtering step, a subband comprising a horizontal low frequency and a vertical high frequency is further filtered.

* * * * *

UNITED STATES PATENT AND TRADEMARK OFFICE
CERTIFICATE OF CORRECTION

PATENT NO. : 7,127,111 B2 Page 1 of 1
APPLICATION NO. : 10/290405
DATED : October 24, 2006
INVENTOR(S) : Takahiro Fukuhara et al.

It is certified that error appears in the above-identified patent and that said Letters Patent is hereby corrected as shown below:

Column 9, lines 45 and 47, change "r>0" to --s/b r=0--.

Column 11, line 67, change "trends" to --tends--.

Column 13, line 4, change "shit" to --shift--

Signed and Sealed this

Twenty-third Day of October, 2007

JON W. DUDAS
*Director of the United States Patent and Trademark Office*